Dec. 17, 1929.                    E. H. LORENZ                    1,740,310
GLASS SHAPING MACHINE
Filed Aug. 8, 1921            19 Sheets-Sheet 1

INVENTOR
Edward H. Lorenz

BY *M. H. Houiss*

ATTORNEY

Dec. 17, 1929.　　　　E. H. LORENZ　　　　1,740,310
GLASS SHAPING MACHINE
Filed Aug. 8, 1921　　　19 Sheets-Sheet 2

INVENTOR
Edward H. Lorenz
BY
ATTORNEY.

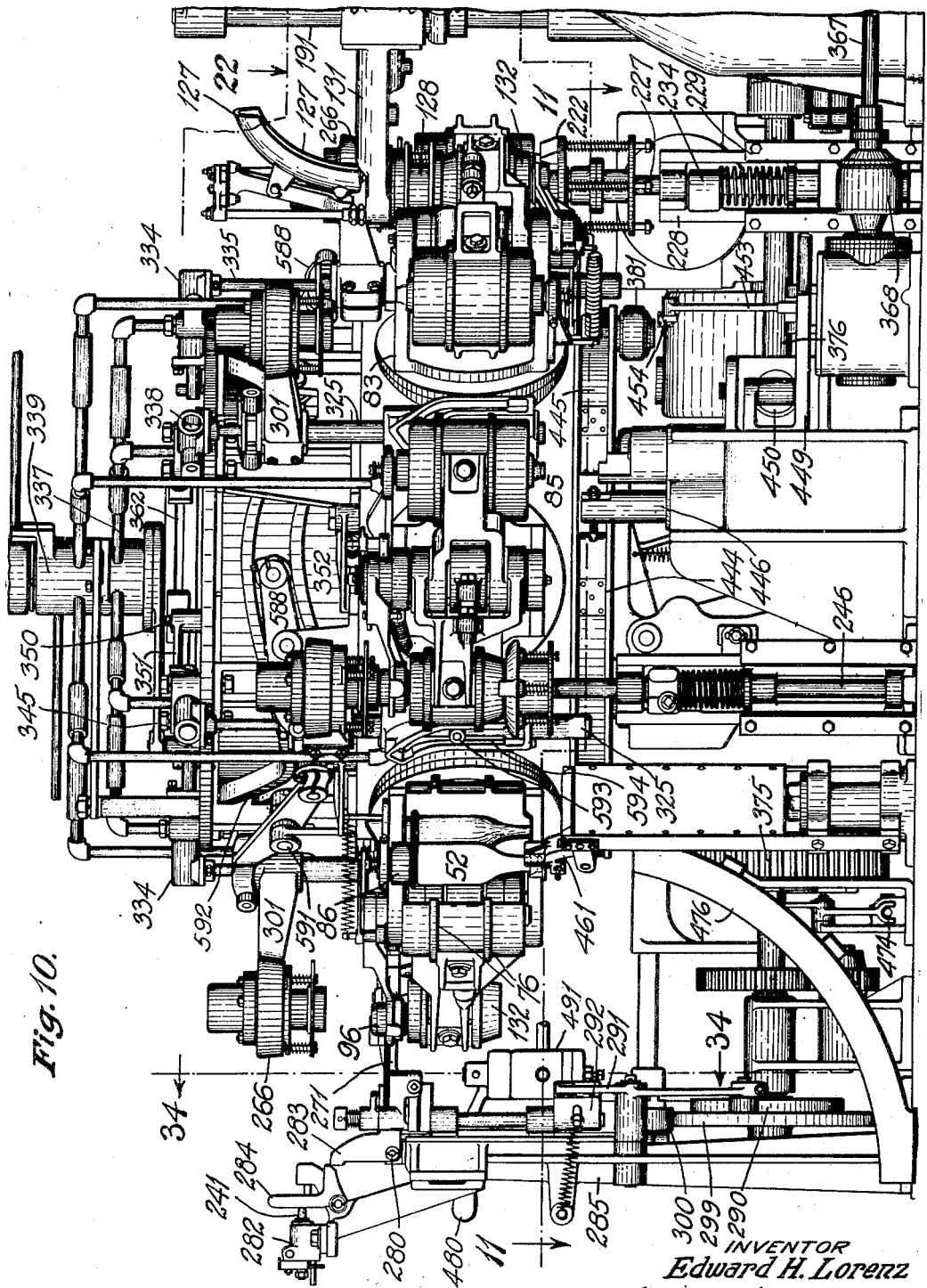

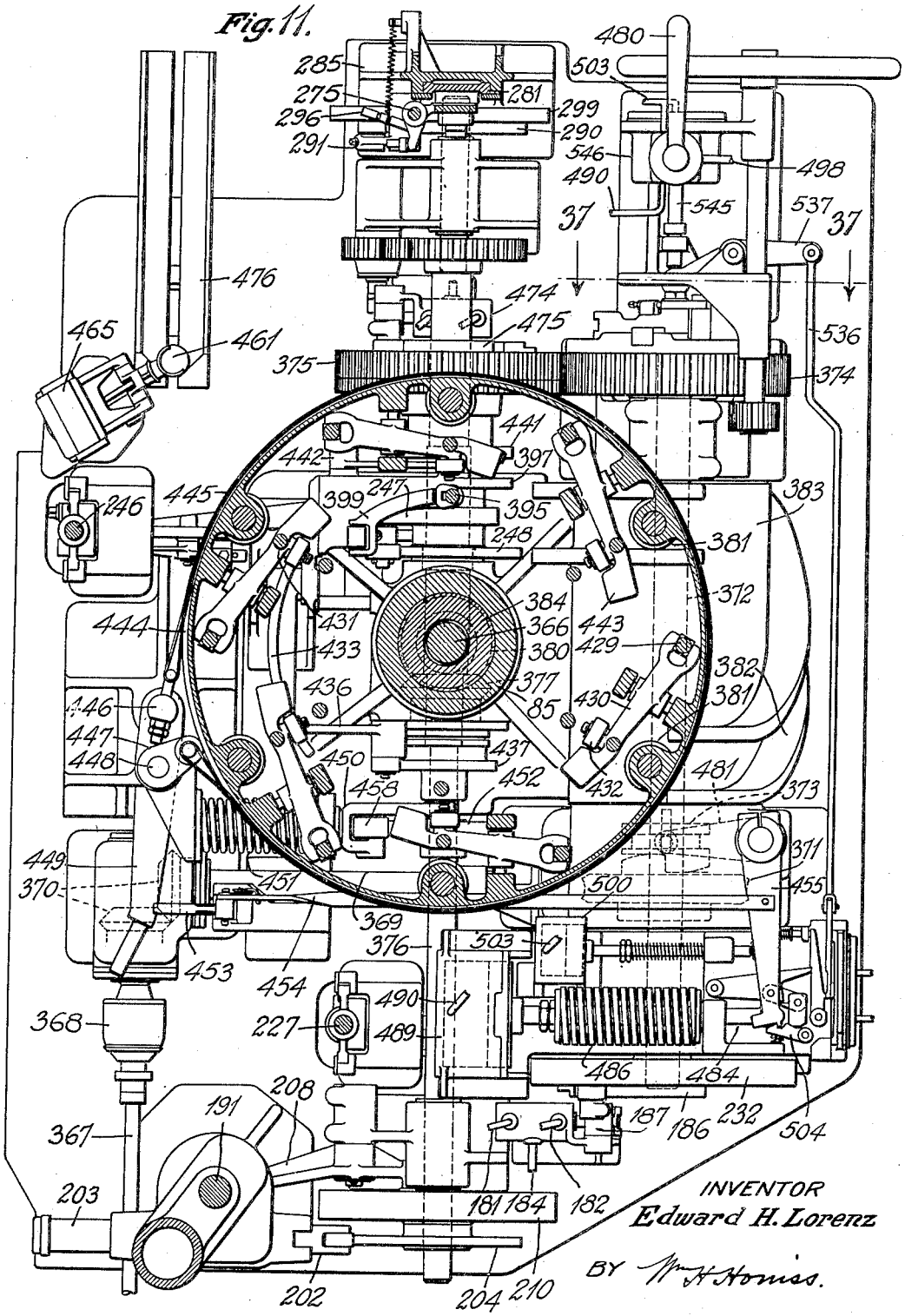

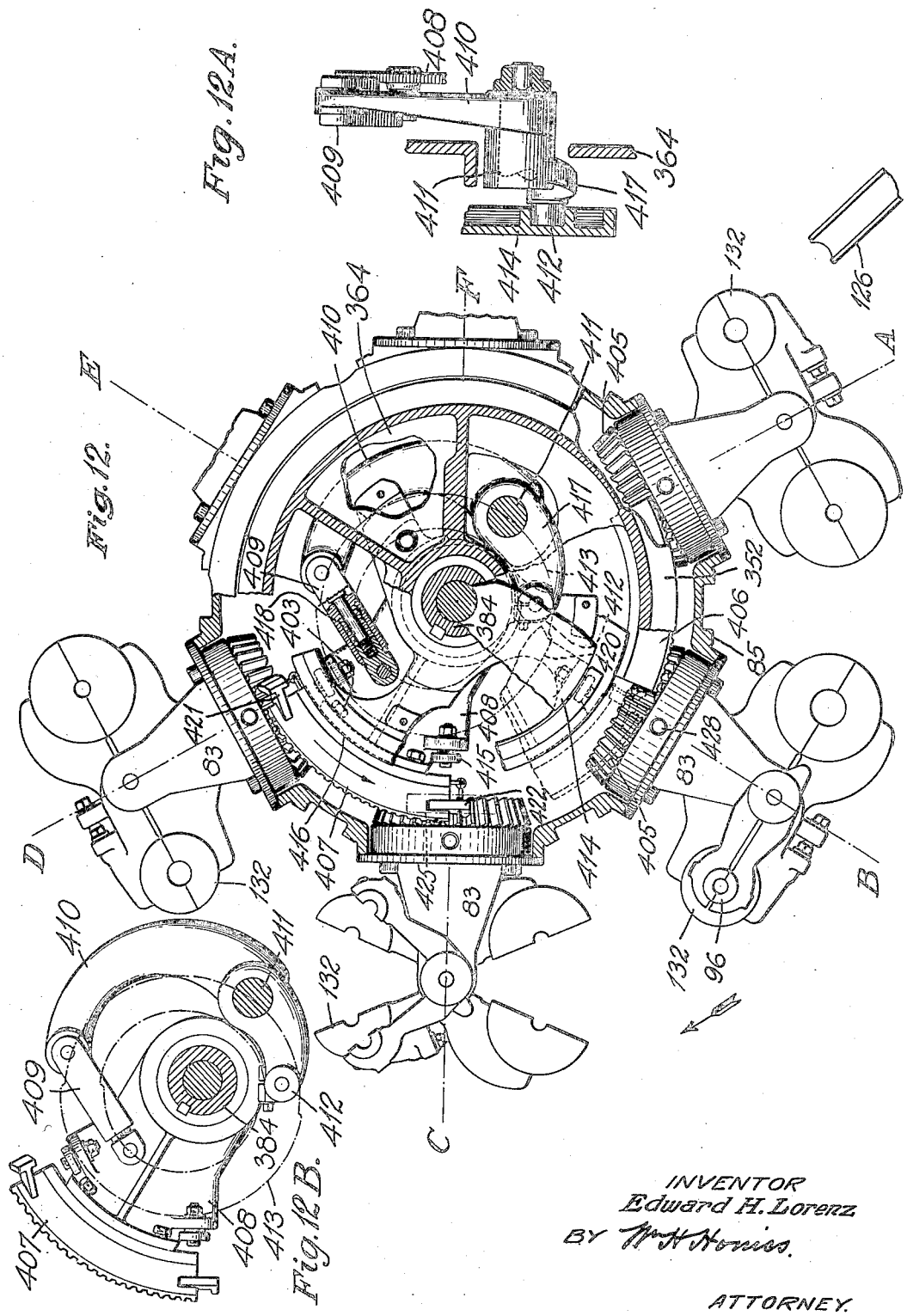

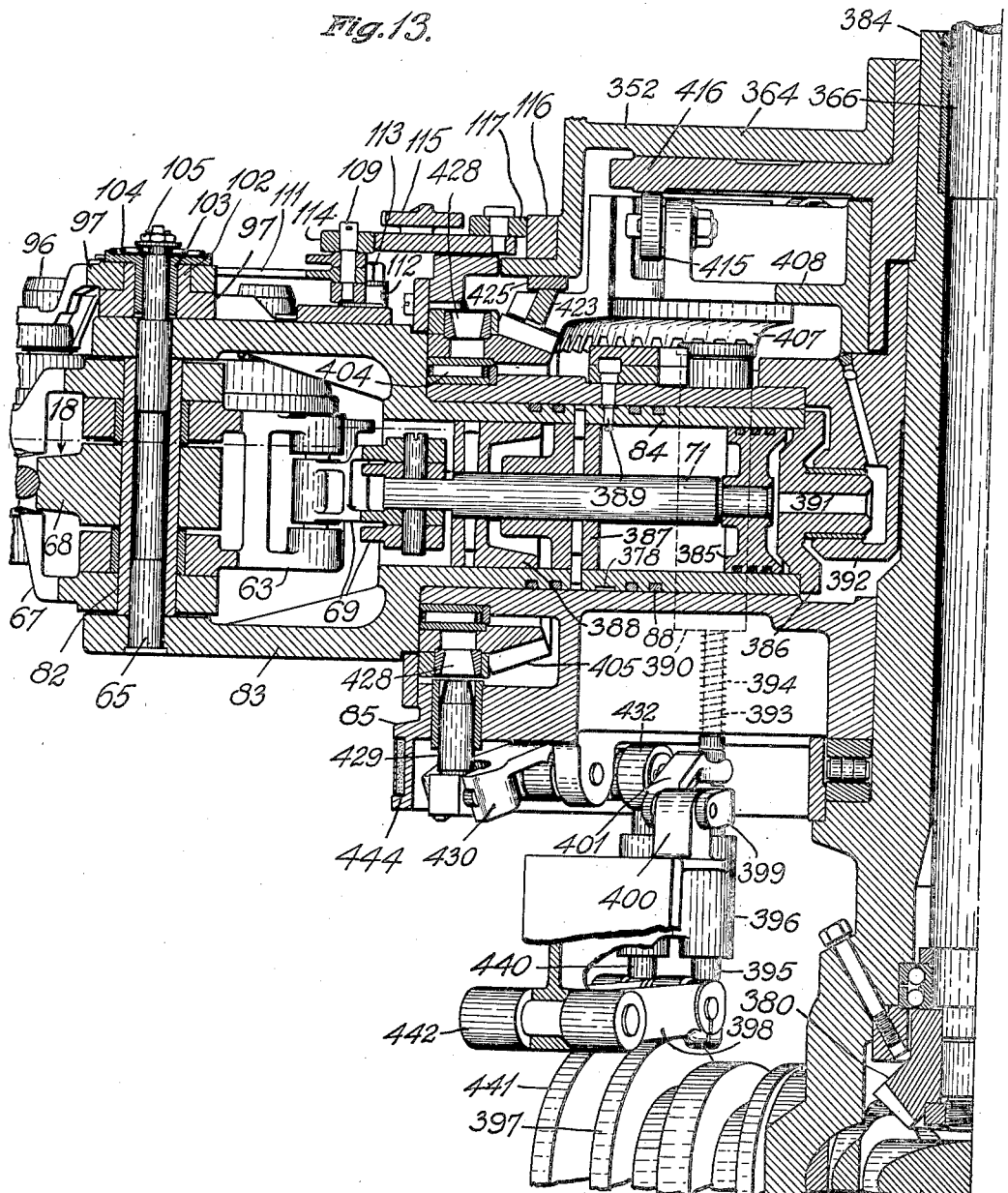

Dec. 17, 1929.  E. H. LORENZ  1,740,310
GLASS SHAPING MACHINE
Filed Aug. 8, 1921  19 Sheets-Sheet 7
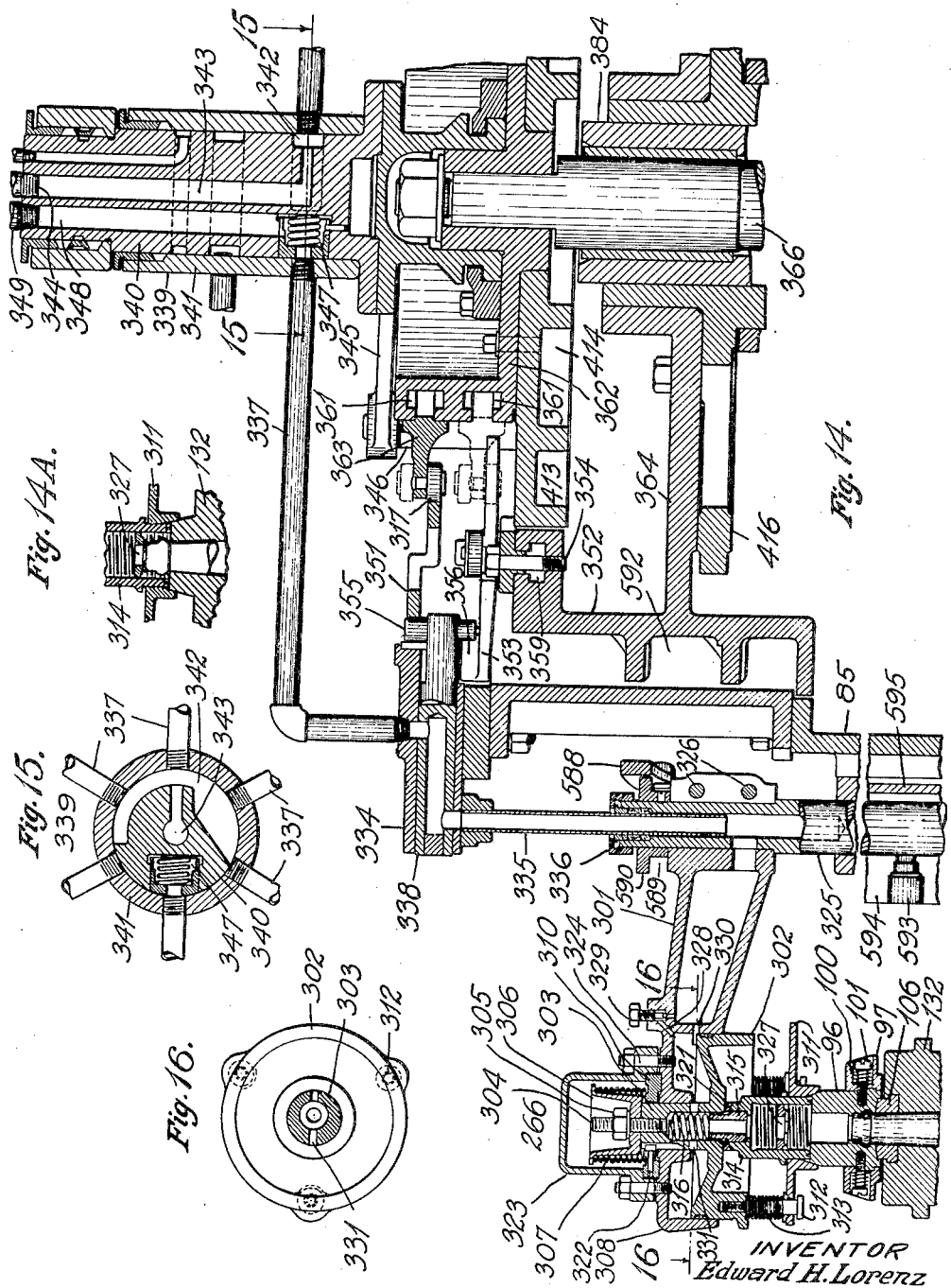

Dec. 17, 1929.  E. H. LORENZ  1,740,310
GLASS SHAPING MACHINE
Filed Aug. 8, 1921   19 Sheets-Sheet 8

INVENTOR
Edward H. Lorenz
BY
ATTORNEY

Dec. 17, 1929.   E. H. LORENZ   1,740,310
GLASS SHAPING MACHINE
Filed Aug. 8, 1921   19 Sheets-Sheet 9

INVENTOR
Edward H. Lorenz
BY
ATTORNEY

Dec. 17, 1929. E. H. LORENZ 1,740,310
GLASS SHAPING MACHINE
Filed Aug. 8, 1921 19 Sheets-Sheet 10
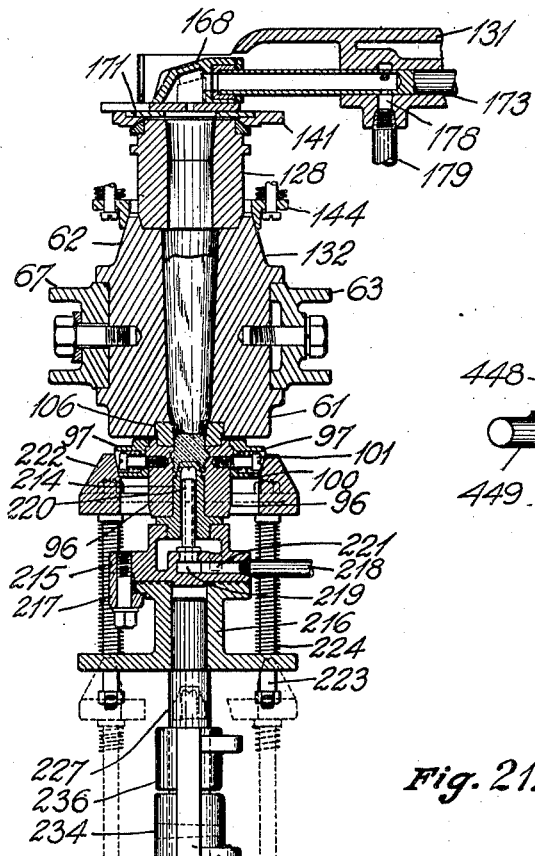
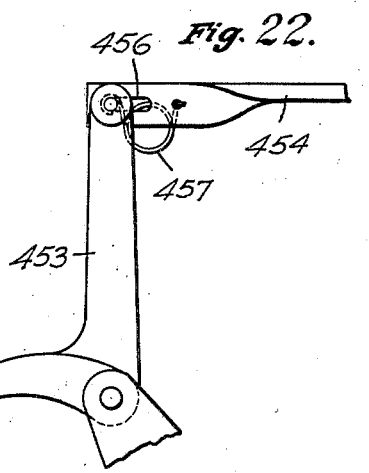
Fig. 22.
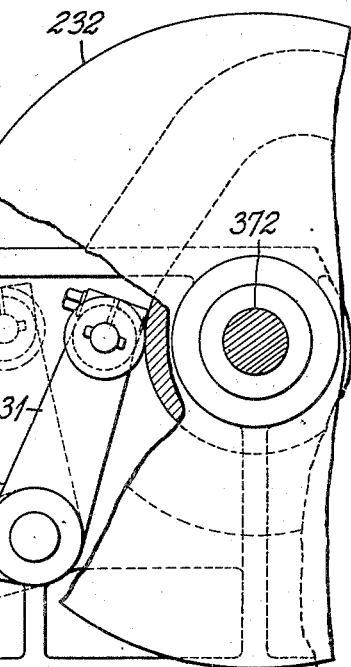
Fig. 21.
INVENTOR
Edward H. Lorenz
BY *W. H. Homiss*
ATTORNEY Dec. 17, 1929.  E. H. LORENZ  1,740,310
GLASS SHAPING MACHINE
Filed Aug. 8, 1921  19 Sheets-Sheet 11
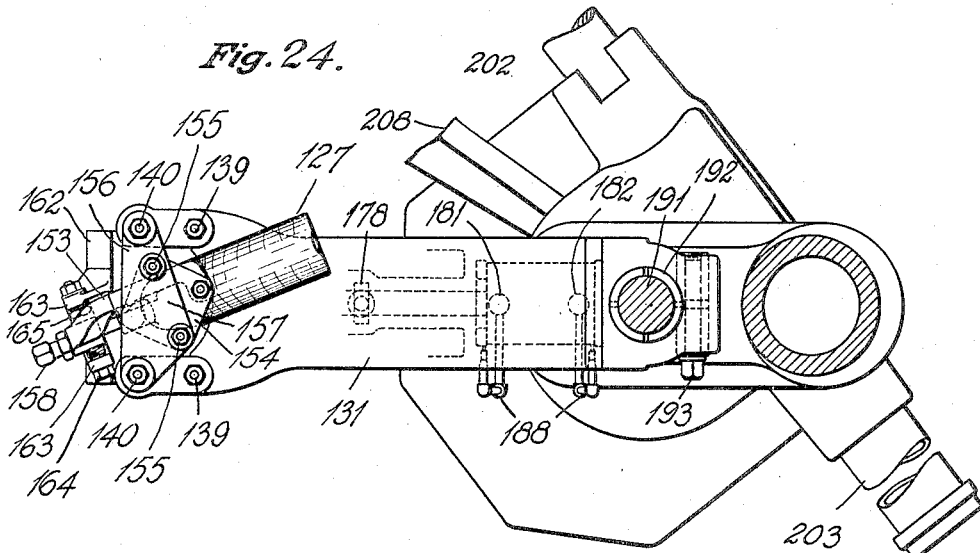
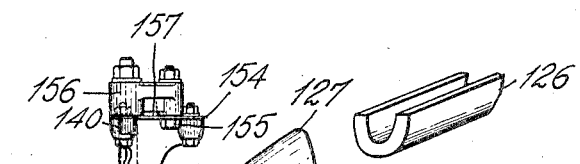
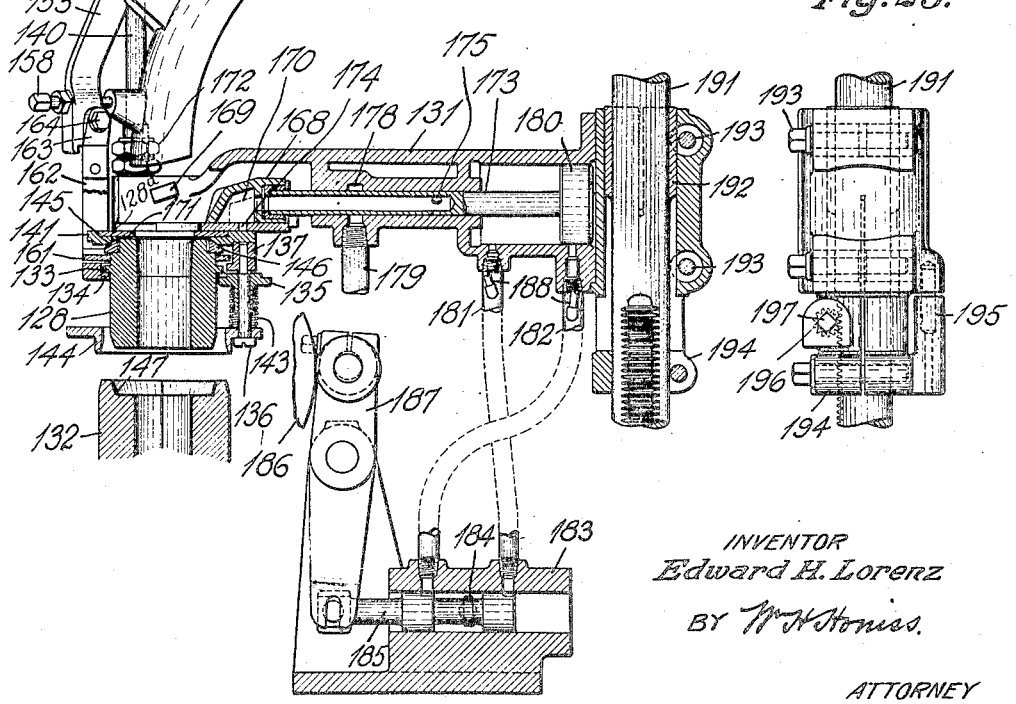
INVENTOR
Edward H. Lorenz
BY
ATTORNEY

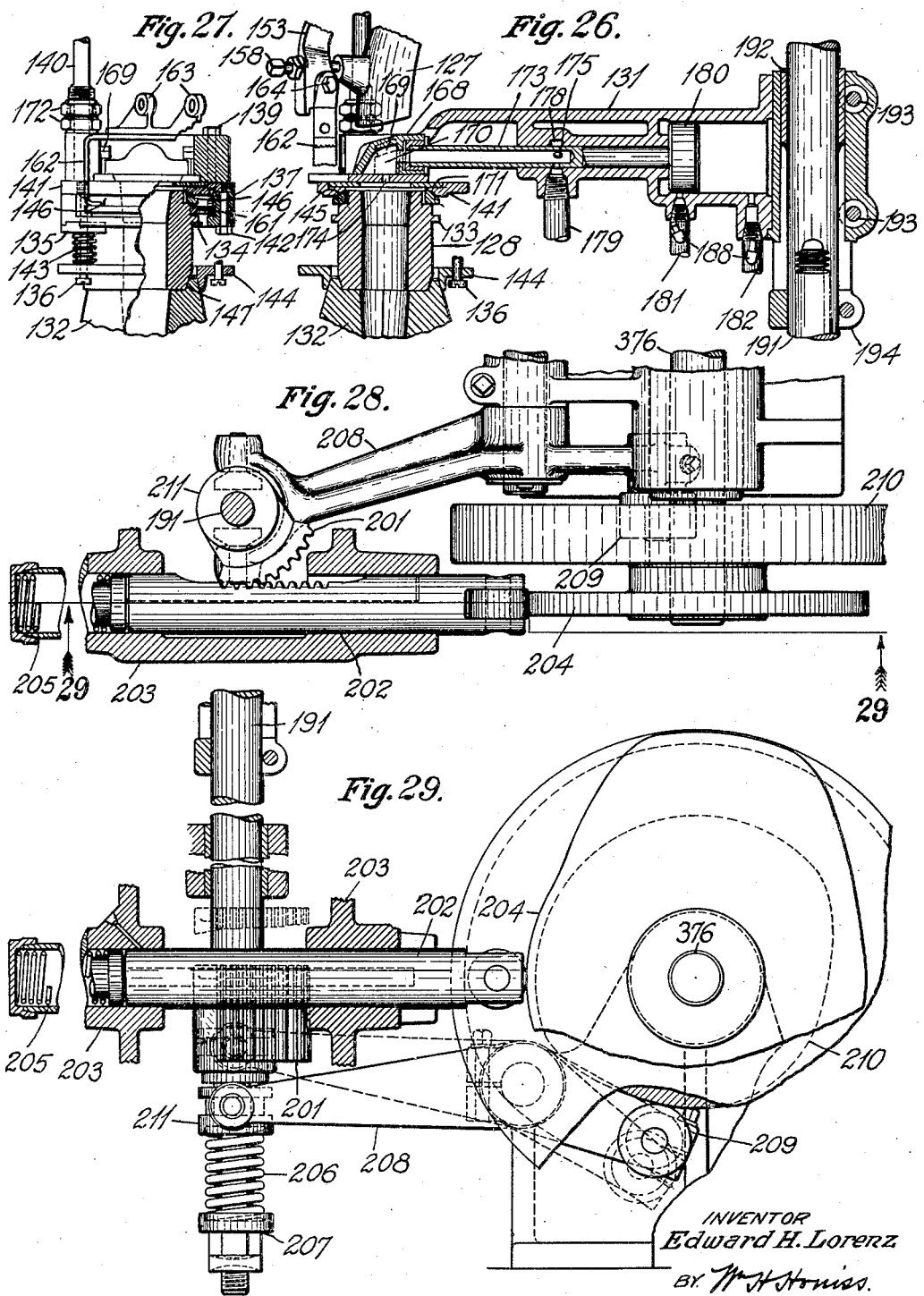

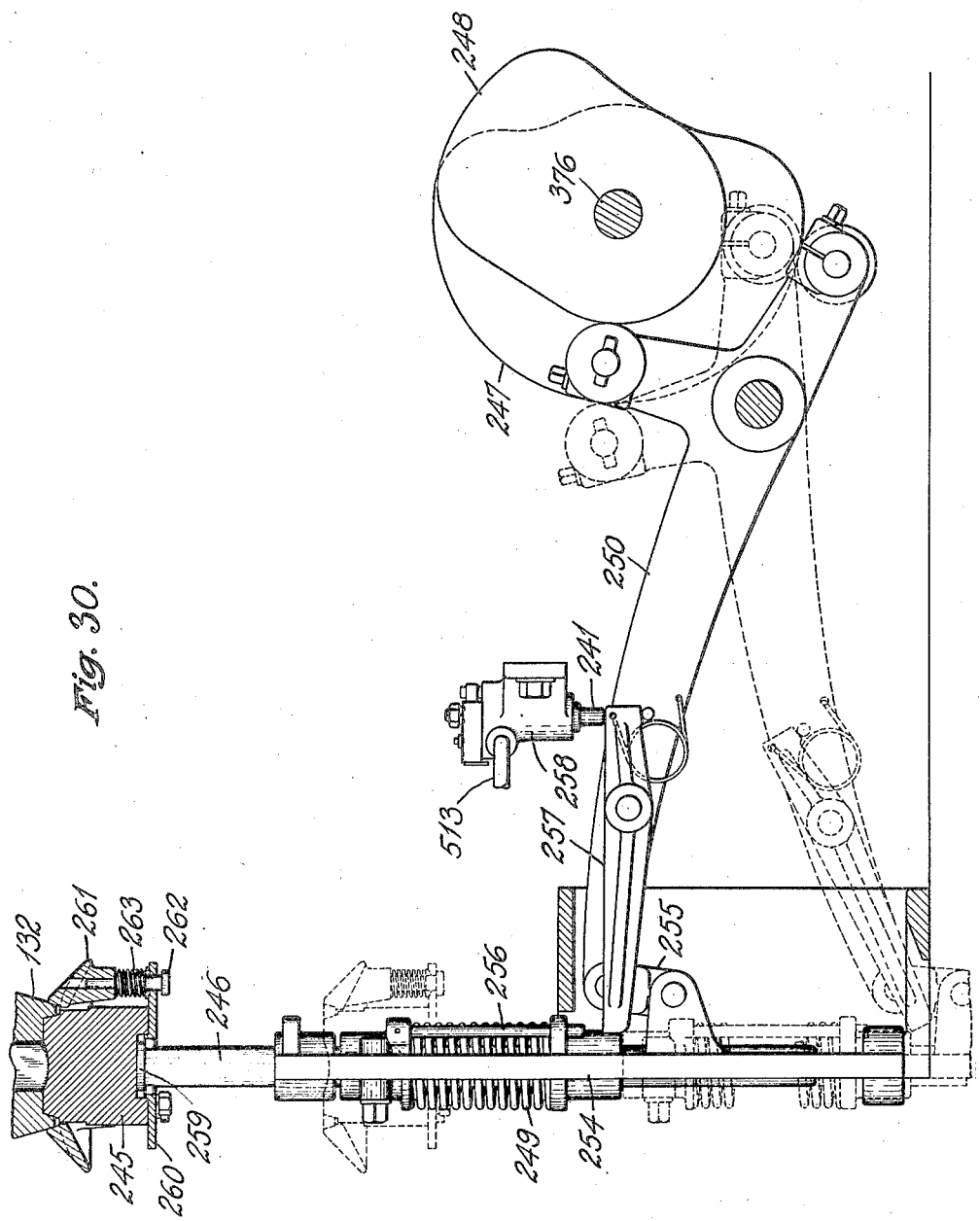

Dec. 17, 1929.  E. H. LORENZ  1,740,310
GLASS SHAPING MACHINE
Filed Aug. 8, 1921    19 Sheets-Sheet 14
Fig. 31.
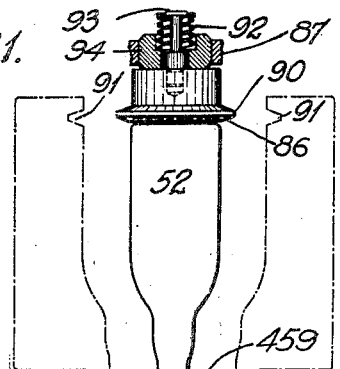
Fig. 32.
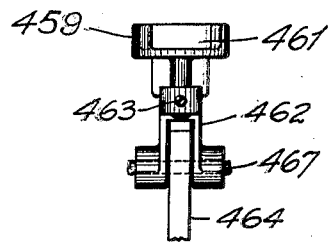
Fig. 33.
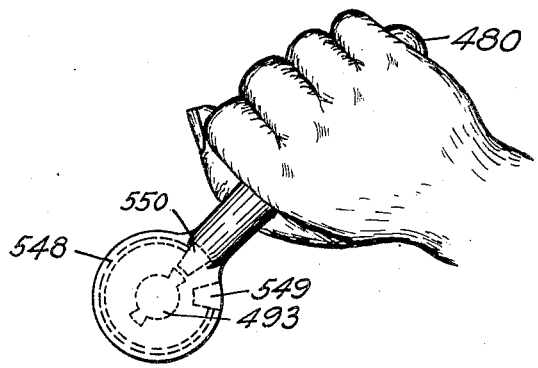
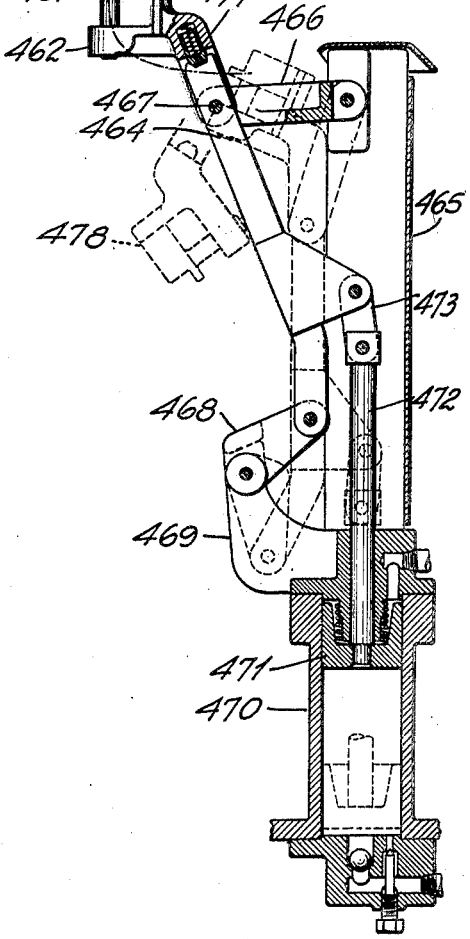
INVENTOR
Edward H. Lorenz
BY
ATTORNEY Dec. 17, 1929.  E. H. LORENZ  1,740,310
GLASS SHAPING MACHINE
Filed Aug. 8, 1921   19 Sheets-Sheet 15
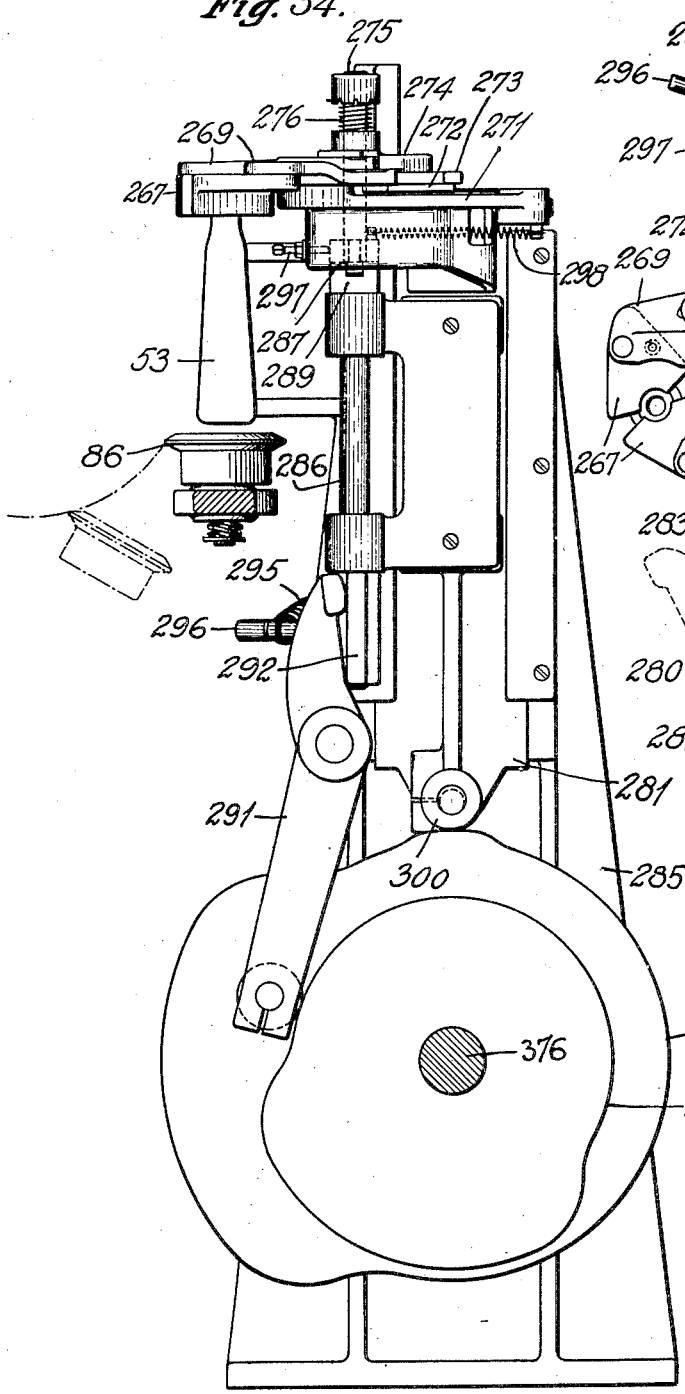
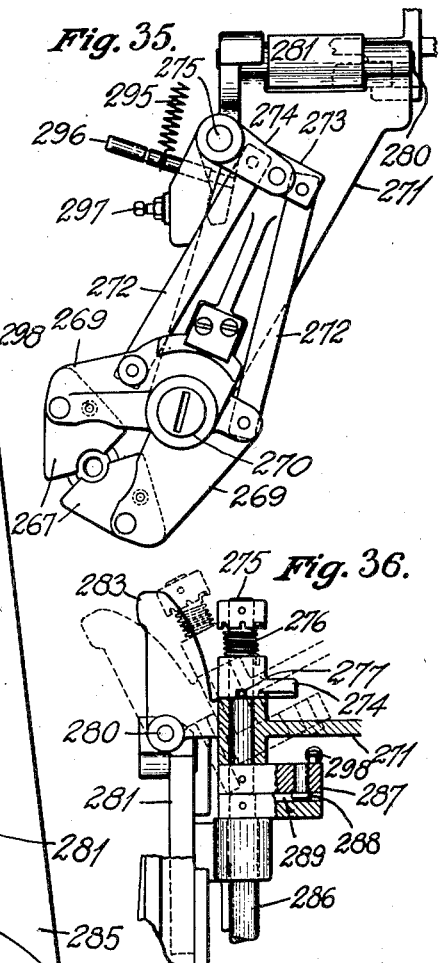
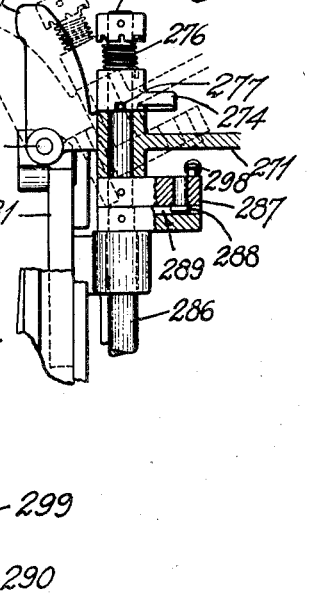
INVENTOR
Edward H. Lorenz
BY
ATTORNEY Dec. 17, 1929.  E. H. LORENZ  1,740,310
GLASS SHAPING MACHINE
Filed Aug. 8, 1921   19 Sheets-Sheet 16
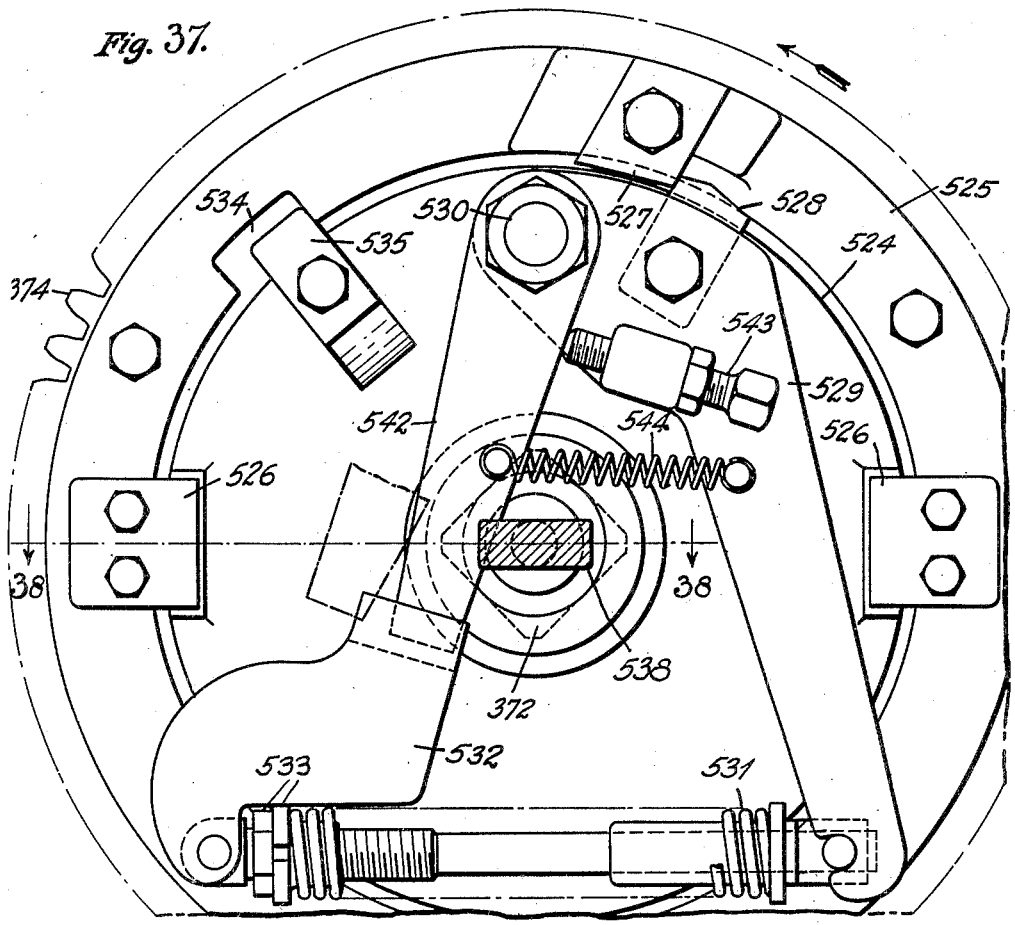
Fig. 37.
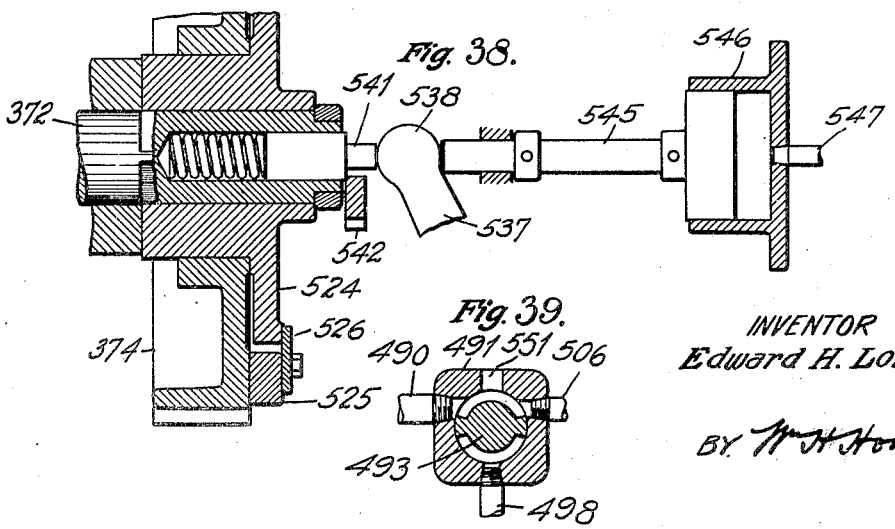
Fig. 38.
Fig. 39.
INVENTOR
Edward H. Lorenz
BY *W H Homiss*
ATTORNEY Dec. 17, 1929. E. H. LORENZ 1,740,310
GLASS SHAPING MACHINE
Filed Aug. 8, 1921   19 Sheets-Sheet 17

INVENTOR
Edward H. Lorenz
BY [signature]
ATTORNEY

Dec. 17, 1929.  E. H. LORENZ  1,740,310
GLASS SHAPING MACHINE
Filed Aug. 8, 1921  19 Sheets-Sheet 18
Fig. 43.
Fig. 42.
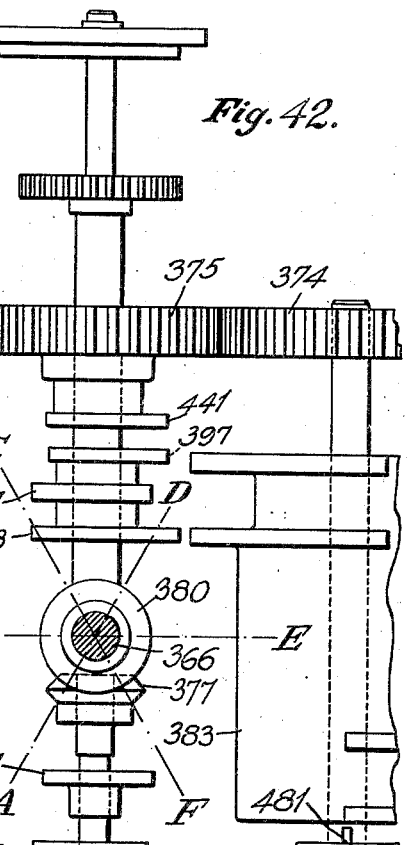
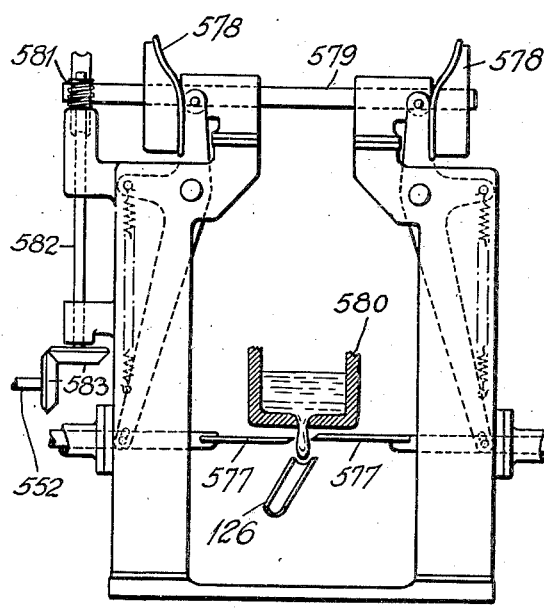
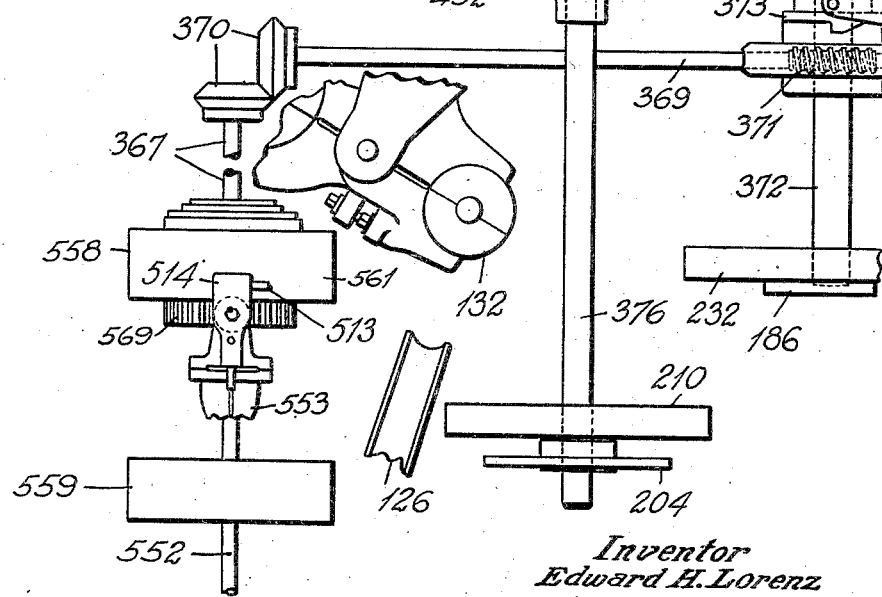
Inventor
Edward H. Lorenz
by: W. H. Howiss, Att'y.

Dec. 17, 1929.  E. H. LORENZ  1,740,310
GLASS SHAPING MACHINE
Filed Aug. 8, 1921   19 Sheets-Sheet 19
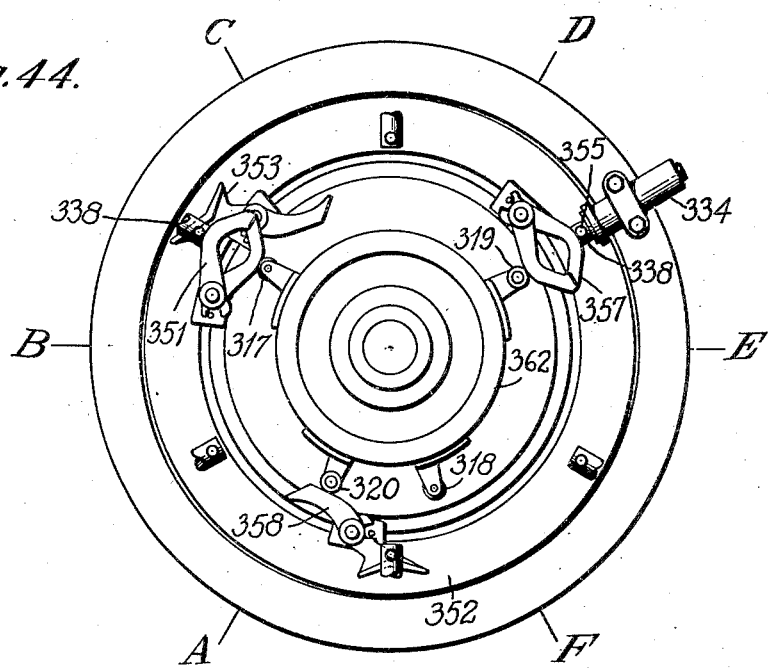
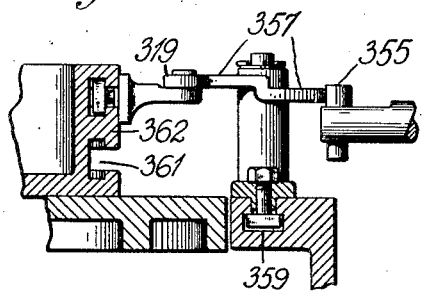
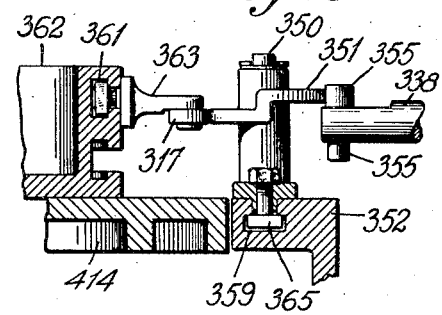
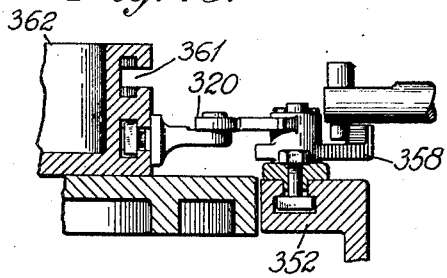
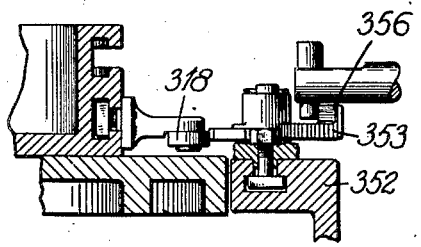
INVENTOR:
Edward H. Lorenz
BY *W. H. Honiss*
ATTY.

Patented Dec. 17, 1929

1,740,310

UNITED STATES PATENT OFFICE

EDWARD H. LORENZ, OF WEST HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE

GLASS-SHAPING MACHINE

Application filed August 8, 1921. Serial No. 490,567.

This invention relates to apparatus for making glassware. The particular embodiment of the invention herein shown and described is for forming bottles by blowing processes, but many features of the invention are susceptible of use with other machines, and for other processes of shaping glassware.

One object of the invention is to provide a new and completely organized machine for shaping glassware, which will rapidly and automatically perform all of the operations necessary to form finished glassware from charges of molten glass.

Another object of the invention is to incorporate certain safety devices in the machine by which it will be stopped in case of abnormal position or operation of its various parts.

A further object is to provide such machines with means for maintaining proper register and timed relation to other machines with which they may be associated, as, for example, a feeding machine for delivering charges of molten glass to the shaping machine. These means include a clutch located in the driving connection between the shaping machine and the feeding machine, or such other associated machine, whereby the shaping machine may be stopped while the feeding, or other associated machine, continues in operation. Means are also included whereby the shaping machine, when again put into operation, will automatically resume operations in proper synchronism and time relation with the feeding machine, or other associated machines referred to.

The various features of the invention employed for the accomplishment of these objects and such others as may hereinafter appear, will best be understood from the following description and accompanying drawings, in which:—

Fig. 10 is a side elevation looking from the left of Fig. 9;

Fig. 11 is a plan view of the lower part of the machine in section taken substantially on the line 11—11 of Fig. 10;

Fig. 12 is a partial plan of the mold carrying turret, certain parts being shown in section and others broken away to show the parts below;

Figure 9:
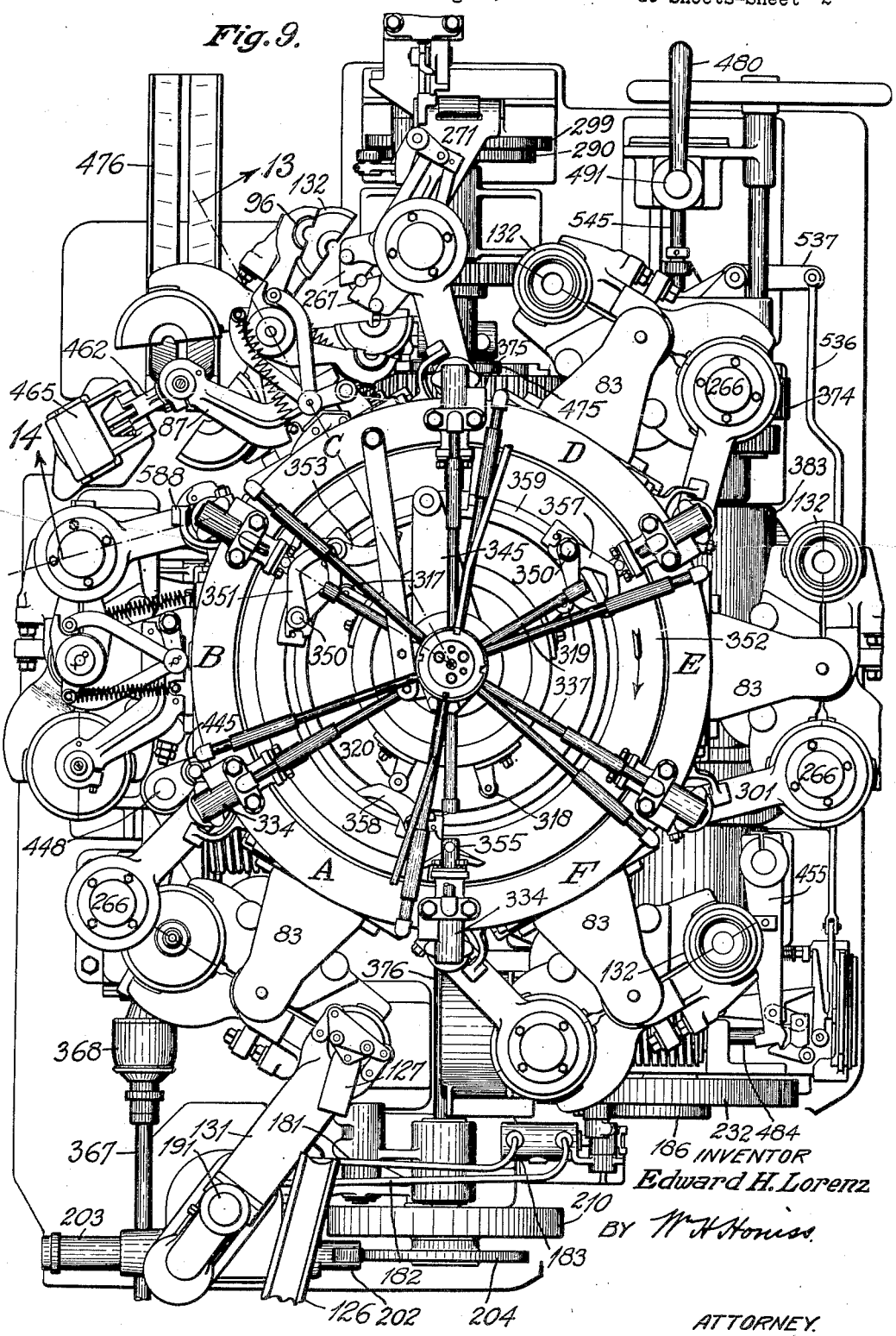
Fig. 9 is a plan view of the machine.
Figure 17:
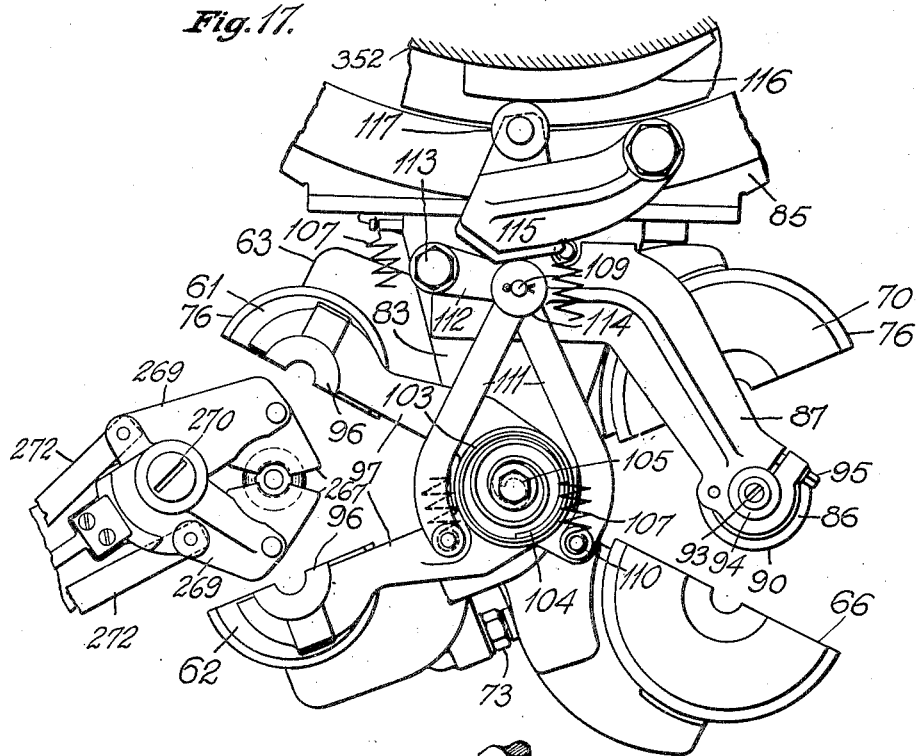
Figure 18:
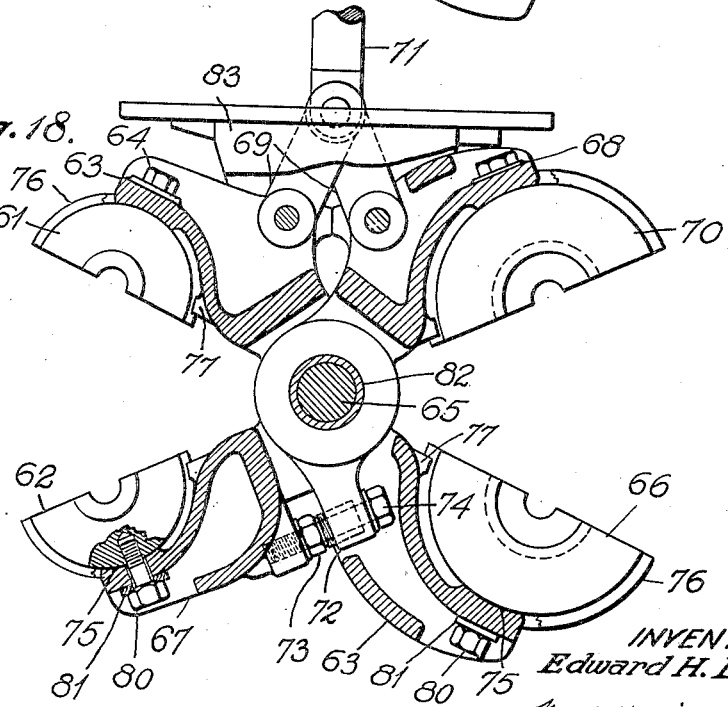
Figure 19:
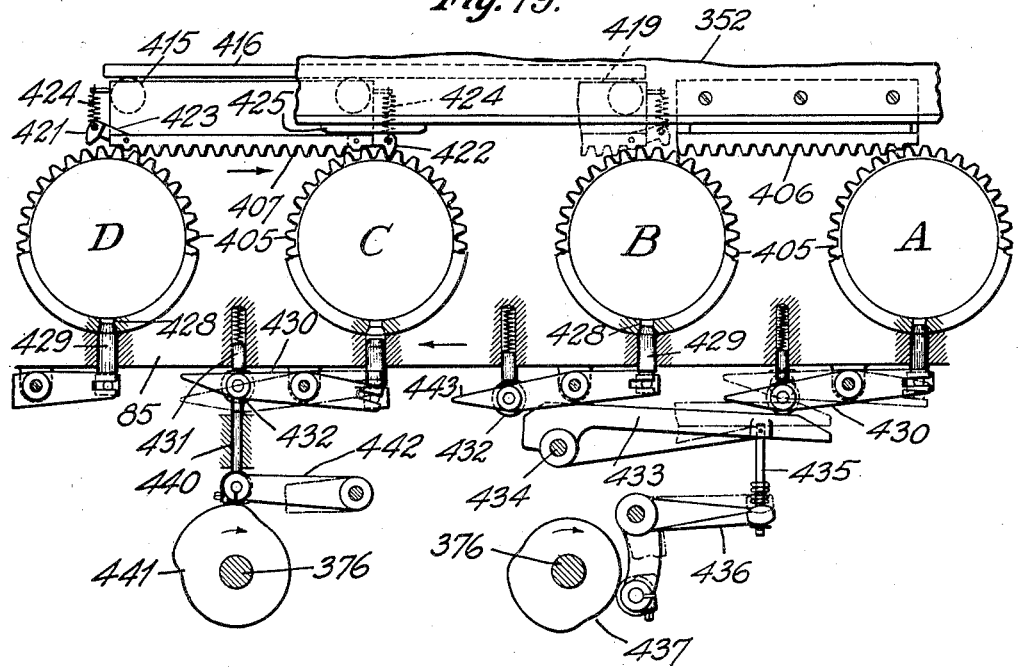
Figure 20:
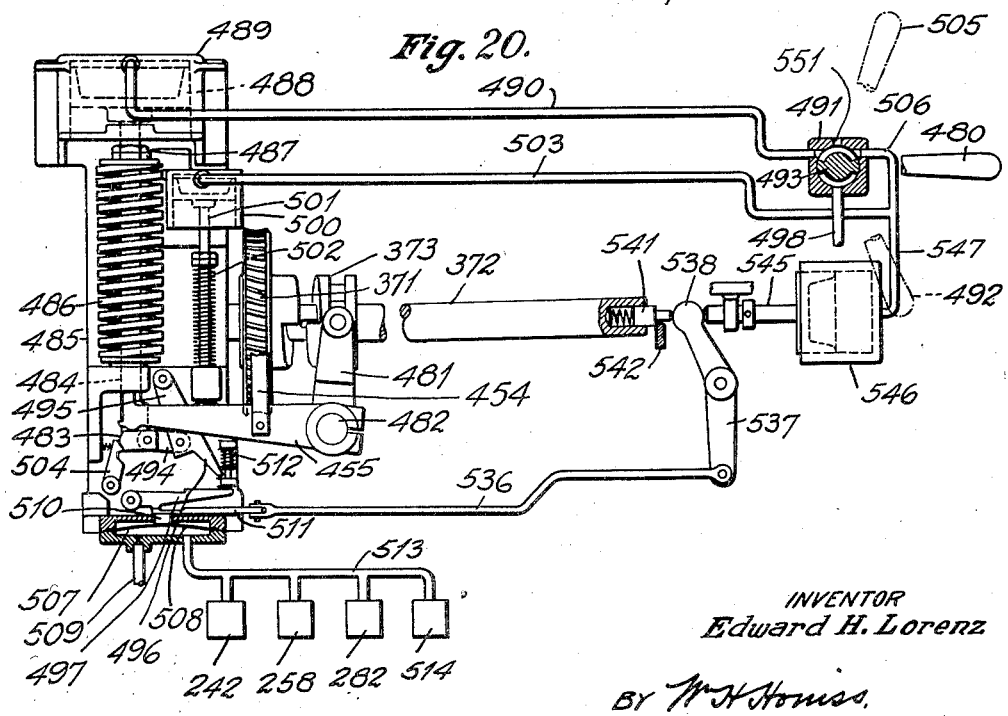
Figure 40:
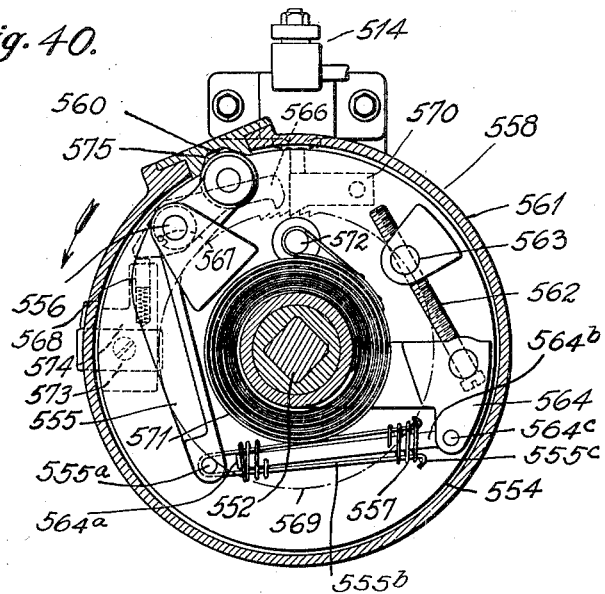
Figure 41:
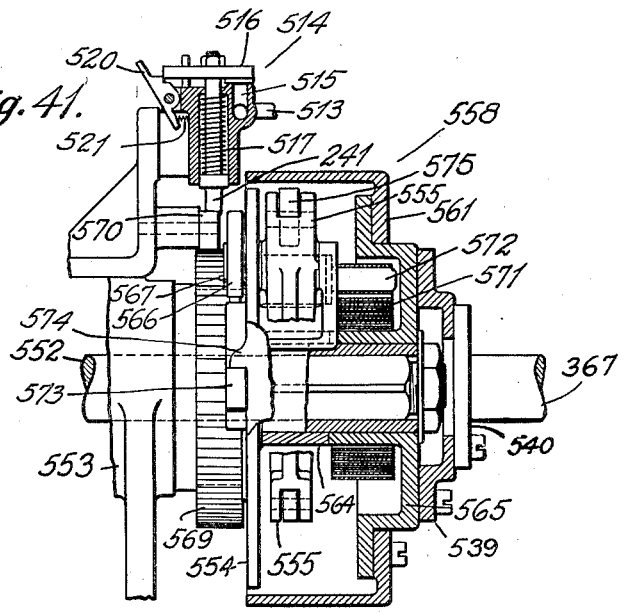

Fig. 12ᴬ is a detail view projected from Fig. 12;

Fig. 12ᴮ is a detail view similar to Fig. 12, but showing only the mechanism for reverting the molds;

Fig. 13 is a vertical section of one of the mold carrying heads taken on the line 13 of Fig. 9;

Fig. 14 is a vertical section through the turret taken substantially on the line 14 of Fig. 9;

Fig. 14ᴬ is a sectional detail showing particularly the engagement of the blow head and the blow mold;

Fig. 15 is a horizontal section of the air distributing head taken on the line 15—15 of Fig. 14;

Fig. 16 is a horizontal section of the blow head, taken on the line 16—16 of Fig. 14;

Fig. 17 is a plan view of a pair of molds in open position;

Fig. 18 is a horizontal section through the molds of Fig. 17 on the line 18 of Fig. 13;

Fig. 19 is a diagrammatic development of a part of the turret showing particularly the means for inverting the molds and locking them to prevent accidental inversion, the view being in elevation, looking toward the center of the machine;

Fig. 20 is a plan view, partly diagrammatic, of the clutch control system;

Fig. 21 is a vertical section through the parison mold and the parts associated therewith, at the mold charging station;

Fig. 22 is a detail elevation of a part of the brake mechanism;

Fig. 23 is a vertical section similar to the upper part of Fig. 21, showing particularly the devices by which a mold charge is directed into the parison mold and the settle blow applied thereto;

Fig. 24 is a plan view of the parts shown in Fig. 23;

Fig. 25 is a detail view, projected from Fig. 23;

Fig. 26 is a sectional detail similar to the Fig. 23, but with certain parts in other positions;

Fig. 27 is an end elevation, partly in section, of the parts shown in Fig. 26;

Fig. 28 is a detail view in horizontal section, of the mechanism for swinging the charge guiding devices into and out of operative position;

Fig. 29 is a vertical section taken on the line 29—29 of Fig. 28;

Fig. 30 is an elevation, partly in section through the center of the parison mold at the counterblow station, showing particularly the mechanism for moving the bottom plate toward and from the mold;

Fig. 31 is a detail of the bottle centralizer operating at the transfer station just prior to the delivery of the finished bottle;

Fig. 32 is a detail view of a part of the centralizer, projected from Fig. 31;

Fig. 33 is a plan view of the handle of the device for starting the machine;

Fig. 34 is a vertical section on the line 34—34 of Fig. 10, showing the transfer tongs and their operating mechanism;

Fig. 35 is a plan view of the transfer tongs;

Fig. 36 is a detail elevation, partly in section, of the pivotal mounting of the transfer tongs;

Fig. 37 is a sectional elevation of one of the overload release devices, taken on the line 37—37 of Fig. 11;

Fig. 38 is a horizontal section on a reduced scale, taken on the line 38—38 of Fig. 37;

Fig. 39 is a horizontal section through the starting valve;

Fig. 40 is an elevation of the main overload release, the cover being in section;

Fig. 41 is an elevation looking from the left in Fig. 40, certain parts being shown in section;

Fig. 42 is a skeleton plan showing the power transmission from the main driving shaft to the shaping machine;

Fig. 43 is a diagrammatic elevation of a feeding machine for delivering mold charges of molten glass to the shaping machine, and its driving connections therewith; and Fig. 44 is a plan view and Figs. 45, 46, 47 and 48 are elevations partly in section, showing in detail the construction and arrangement of the devices for operating the blow valves.

*General operation.*—The machine is provided with a series of pairs of molds, each pair comprising a parison mold and a blow mold arranged side by side on a rotatable head, with their neck portions extending in opposite directions. The head is mounted to rotate on a horizontal axis extending radially of a rotatable carrier, hereinafter called a turret, and the turret is intermittently rotated about a vertical axis so as to present the pairs of molds successively to a series of operating stations where various steps indicated in Figs. 1 to 8, are performed in the shaping of the ware, although certain operations are or may be performed while the molds are moving from one station to the next. In the illustrated embodiment of the invention, there are six pairs of molds and six operating stations, the latter being indicated by letters A, B, C, D, E and F.

Figure 1:
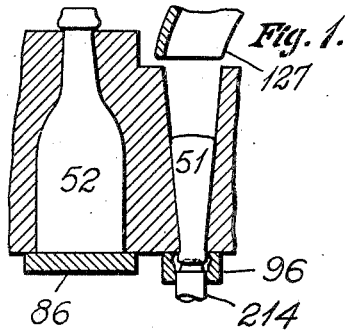
Figures 1 to 8 are diagrammatic views illustrating the principal steps in the formation of a bottle by the machine of the present invention.
Figure 2:
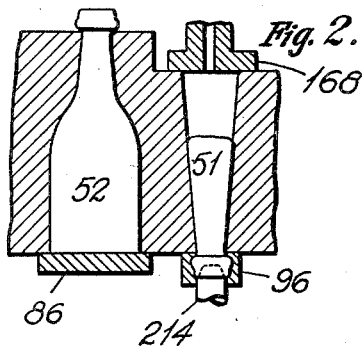

Figs. 1 to 8 illustrate diagrammatically the several steps in the production of the bottle. Fig. 1 illustrates the first operation which takes place when a pair of molds are at the mold charging station A, at which a mold charge 51 is delivered to the parison mold, of which the bottom end, having a larger opening for receiving the charge, is preferably uppermost. The blow mold has the neck end up and contains a previously formed bottle 52. The neck end of the parison mold is closed by a neck ring 96 and a plunger 214. The settle blow operation, also performed at station A, is shown in Fig. 2 where a blow head 168 has moved over the mold and compressed air is admitted therethrough, forcing the glass downward in the mold, and settling it compactly in the neck ring and around the plunger, to shape the top or "finish" of the bottle.

Figure 3:
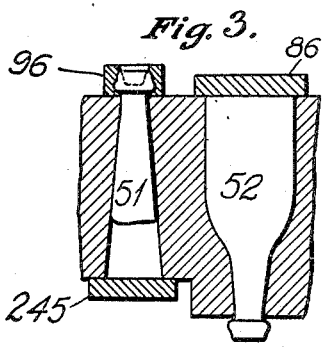
Figure 4:
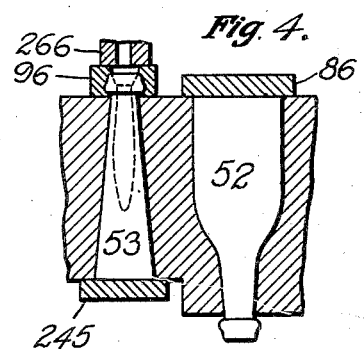

The turret is then rotated through a sufficient angle to present this pair of molds at the counterblow station B. During this movement the molds are inverted so that they arrive with the neck end of the parison mold up, and the neck end of the blow mold down, as shown in Figs. 3 and 4. A parison bottom plate 245 moves up to close the bottom of the parison mold, a blow head 266 (Fig. 4) moves into contact with the neck ring, and compressed air is admitted causing the glass to expand and fit the mold and complete the parison 53. This is known as the counterblow.

Figure 5:
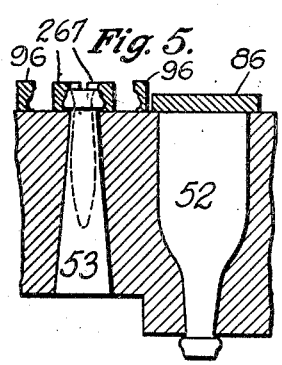
Figure 6:
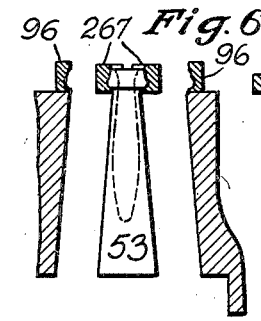
Figure 7:
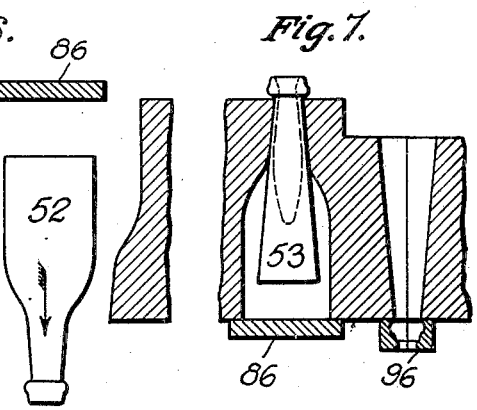

The pair of molds now moves to the transfer station C where the parison is transferred from the parison mold to the blow mold, (Figs. 5, 6, and 7). The neck ring 96 has been opened during its travel to station C, and the projecting neck of the bottle is engaged by jaws 267 (Fig. 5), forming a part of the transfer tongs. Both molds are now opened leaving the parison suspended by the jaws 267 (Fig. 6), and releasing the previously finished bottle 52 from the blow mold. The molds are reverted and made to exchange positions during their dwell at this station by a half rotation of the head, thus bringing the open halves of the blow mold around the suspended parison which has meanwhile remained substantially stationary. The molds now close, enclosing the parison within the blow mold (Fig. 7) and leaving the empty parison mold with its neck portion down.

The parison is next expanded to final form by the finishing blow. The parts for performing the finishing blow travel with the molds and, therefore, it is not necessary for this operation to stop the molds at fixed stations, as is done for certain other operations. It is one of the objects of the invention to arrange the finish blow mechanism so that the blow may be begun at any desired time after the molds reach station D and may be continued for any desired time throughout the range of three stations, D, E and F, called blow stations. This allows the parison to elongate and its chilled skin to reheat before blowing as desired, and gives some control over the setting of the bottle in its final form. These factors should be adjusted to suit the requirements of different sizes or types of ware. The molds move to the first blow station D and the blow head 266 moves into communication with the neck of the parison. At any desired time thereafter, air is admitted through the blow head, expanding the parison to the form of the finished bottle 52, as shown in Fig. 8.

Figure 8:
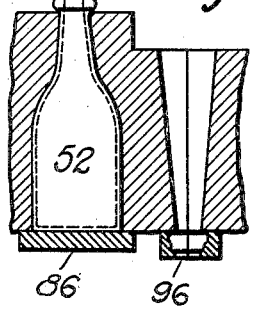

At stations D, E, and F and during the traverse of the mold between stations, the same conditions prevail as shown in Fig. 8, although the blowing pressure may or may not be acting all the time. After leaving station F the cycle of the machine is completed, the empty parison mold being now in position to receive another charge and a finished bottle being carried by the finishing mold.

*Molds.*—One of the features of this invention resides in the construction of the molds, the mold carriers and the associated parts of the mold heads. The mold carriers resemble double ended tongs, their arms crossing each other like the letter X, so that each blow mold half is on the same arm as the diagonally opposite half of its associated parison mold. The mold halves are attached to the mold carriers in such a manner as to be easily removable, and to permit free expansion of each half when it becomes heated, without distorting the mold and thereby producing defective ware. One half of each mold is also adjustably secured to the carrier so as to permit the perfect matching of the two halves when in closed position.

The parison mold comprises two similar halves 61 and 62 (Figs. 17 and 18), provided with cavities having the form of the desired parison. The mold half 61 is rigidly attached by a screw 64 to a carrier 63 which is bored to receive a stud 65 (Figs. 13 and 18), about which it is adapted to swing, and it is extended on the opposite side of the stud to provide a somewhat similar arm to which the diagonally opposite half 66 of the blow mold is attached. The other half 62 of the parison mold is mounted on a carrier generally similar to the carrier 63, but is made in two parts having a rigid but adjustable connection for adjusting the mold half 62, so that both molds will close tightly so as to avoid the formation of fins on either the parison or the finished bottle. For this purpose the carrier for the part 62 of the parison mold, comprises two arms 67 and 68 (Fig. 18), both pivotally mounted on the stud 65 and rigidly but adjustably secured together so as to move in unison. The other half 70 of the blow mold is mounted on the arm 68 of this carrier. The adjustable connection between the arms 67 and 68 comprises a finger 72 projecting from the hub of the arm 68, which carries a hollow stop screw 73, the head of which bears against a lug on the carrier 67. By turning this screw the relative angular position of the diagonally opposite mold halves 62 and 70 may be adjusted. The two arms are locked in adjusted position by a screw 74 which passes through the hollow screw 73 and is threaded into the lug on the arm 67.

The molds are opened and closed by a toggle mechanism comprising toggle links 69 having their outer ends pivotally connected, one with the mold carrier 63 and the other with the arm 68 of the carrier 67—68. The other ends of the links are both connected with a rod 71 which is reciprocated by mechanism later described, to open and close the molds. (Figs. 17 and 18.) Each carrier is provided with a pad 75 (Fig. 18) against which the mold half is clamped. Both molds are provided with flanges 76 (Fig. 10) which engage the sides of the mold carriers and lugs 77 (Fig. 18) formed on the carriers. These lugs do not engage the peripheral surface of the mold and therefore do not interfere with its expansion.

In order that both abutting edges of each mold may contact evenly, one half of each mold is adjustably mounted on its carrier. The mold halves 62 and 66 are adjustably secured to the arm of their respective carriers 67 and 63 by screws 80 (Fig. 18) which pass through clearance holes in the carriers and are threaded into the molds. The under surface of each screw head is spherical, so as to seat in a washer 81 provided with a complementary spherical seat. By this construction, if one edge of a mold half contacts with its mate before the other, the screw 80 may be loosened and the mold half rocked to secure even contact between the halves. This rocking is permitted by the clearance in the hole for the screw 80, and when the screw is again tightened, the washer will provide a firm seat for the screw head irrespective of slight angular movement of the screw.

In order to facilitate the assembling and handling of the mold carriers when they are detached from the machine, they are not mounted directly on the stud 65, but are mounted on a bushing 82 (Figs. 13 and 18) which, in turn, is mounted on the stud. This construction permits the mold carriers to be removed from the machine as a unit.

In order that the mold carrying head may be rotated to invert the molds, the stud 65 of the mold carriers is mounted in the ends of a fork 83 formed integral with a cylinder 84 which is mounted radially in a main turret 85 (Fig. 13). This cylinder is arranged to be rotated about its horizontal axis in the turret by mechanism hereinafter described.

Each finish mold has permanently associated therewith a bottom plate 86 carried by an arm 87 fixed on the fork 83 (Figs. 17 and 31) and provided with a flange 90, wedge shaped in cross section, and adapted to engage a complementary groove 91 in the mold halves. In order to prevent wear, during opening and closing of the molds, between the bottom plate and the edges of the mold cavity which engage it, the bottom plate is urged away from the mold cavity by a spring 92 surrounding a stud 93 fixed in the bottom plate. One end of the spring abuts against a washer on the head of a stud and the other end engages a plug 94 so that the bottom plate is held yieldingly up when the mold is open (Fig. 31) and is pulled down into final engagement with the mold by the closure of the mold itself. This prevents damage to mold corners and bottom plate and avoids fins on the finished ware. The bottom plate may be adjusted longitudinally of the molds, by means of the plug 94 which is adjustably secured in the arm 87 by a screw 95 (Fig. 17).

*Neck ring.*—The parison mold of each pair has permanently associated therewith a neck ring which, like the mold, is in halves. The neck ring halves 96 (Fig. 13, 14, 17 and 21) are carried on the ends of two arms 97 rotatably mounted on the stud 65 of the mold carriers. In order that the halves of the neck ring may always close into firm contact, they are mounted so as to permit them to rock in the arms 97, if one side contacts before the other. This mounting comprises a flange on the outside of the neck ring fitting into an annular groove on the inside of the arms and a screw 101 threaded into the neck ring. Each neck ring half is held yieldingly in its seat in the arm by a spring 100, seated in a hole in the arm and engaging the head of the screw 101, and the hole for the passage of the screw through the arm is elongated so as to permit a slight shifting of each half as the two halves come into contact.

To insure correct alignment of the two halves of the neck ring with each other and with the mold, and to allow for wear and expansion of the parts when heated, the neck ring arms 97 are mounted on the stud 65 as shown in Fig. 13. The lower arm 97 of this figure is provided with an integral sleeve 102 which forms a bearing for the upper arm. The arms are yieldingly held in contact axially by a flanged bushing 103 on the stud 65 within the hub of the lower arm, and by a conical spring 104, held down by a nut 105 on the stud 65. This spring permits the parts to expand under heat and also takes up wear, thus maintaining proper alignment of the neck ring halves. When the neck ring closes, it embraces a hub or collar 106 (Figs. 14 and 21), which may be integral with the mold but for convenient replacement, is shown as a separate piece set into each mold half.

The neck ring is arranged to be opened and closed independently of the opening and closing of the molds, although, as will hereinafter appear, the preferred construction is such that the closing of the molds controls the closing of the neck ring. The neck ring is held in the closed position by springs 107 (Fig. 17) each of which has one end attached to a fixed support and the other end connected with pins 110 secured one in each of the neck ring arms 97. These pins are on opposite sides of the pivotal mounting of the arms, so that the springs draw the neck ring halves together. The neck rings are opened by links 111 loosely mounted on each of the pins 110 and having their other ends pivotally mounted on a stud 109 carried by the end of an arm 112, mounted on a pivot 113 carried by the fork 83 (Fig. 17). The stud 109 also carries a roll 114 which, at times, is engaged by a lever 115 pivotally mounted on the turret. This lever is moved out to engage the roll 114 and open the neck rings, by a cam 116 which engages a roll 117 on the lever.

The mechanisms which operate at the respective stations will be best understood by following one pair of molds from station to station, and considering the mechanisms, so far as may be convenient, in the order in which they operate.

*Station A.*—This is the mold charging station at which the mold charge is delivered to the parison mold, as indicated diagrammatically in Figs. 1 and 2. The charge of molten glass may be delivered to the parison mold from a hand operated punty but, in commercial use, some of the well-known forms of feeding machines which automatically deliver mold charges at predetermined periods would ordinarily be employed, either dropping the charges directly into the molds from a delivery outlet located over the mold, or delivering them along an inclined delivery chute 126 (Fig. 23). In either case it is desirable to provide guiding devices to direct the charge centrally into the mold.

When the mold charge is received in the mold, it is packed firmly into the lower part of the mold, so as to assume the mold shape and to impart the final form or "finish" to the top of the bottle. As illustrated herein, this is done by fluid pressure, this operation being known as the "settle blow."

*Charge guiding devices.*—The guiding devices and a part of the settle blow mechanism are arranged to move into operative relation with the parison mold, after it has arrived in charging position, and in order to provide the necessary clearance of moving parts these mechanisms also swing toward and from the turret.

As the charge of molten glass leaves the chute 126, a deflector 127 (Figs. 9, 10 and 23) deflects it to the parison mold, into which it is guided centrally and vertically by a bushing 128. Both of these guiding devices are carried on the end of an arm 131 by which they are moved vertically toward and from the mold, and are swung laterally out of the path of the moving parts, between charging operations. When the parison mold, indicated as a whole at 132, stops in charging position, the arm 131 swings into position above the mold (Fig. 23). The arm then moves the bushing 128 down into contact with the mold, in which position it remains during the charging operation.

To allow for variation in the stopping position and perpendicularity of successive molds, which is likely to occur even with the best construction, the bushing 128 is loosely supported in such a manner that it registers automatically with the mold when moved into contact therewith, having perfect alignment both with the mold opening and with the axis of the mold body, so that the mold charge is always directed into the center of the mold.

The bushing is thus loosely supported below the end of the arm 131 (Fig. 23) by a flange 133 on the bushing, which rests on a ring 134 supported by three flanged collars 135. These collars are mounted on studs 136 fastened in a casting 137 which is attached to a bearing plate 141 by screws 142 (Fig. 27). The casting 137 and bearing plate 141 which are, in effect, integral, are fixed to the end of the arm 131 by screws 139 and the lower ends of posts 140. The flanged collars 135 are held up by springs 143 surrounding the studs 136, the lower ends of which engage the upper surface of a collar 144 which is supported at this time by the heads of the studs 136. These springs hold the bushing 128, which is provided with a convexed upper surface 128ª, yieldingly in a spherical seat 145 in the bearing plate 141 the convexed portion 128ª together with the spherical seat 145 form, in effect, a ball and socket joint which permits the bushing to move laterally in any direction.

In order that the bushing may be capable of a bodily lateral movement as well as an angular movement, its spherical seating surface is formed on a ring 146 loosely surrounding the upper end of the bushing. Thus the bushing is free to move laterally with respect to the ring 146 and when moved angularly, the bushing and ring turn together in the seat 145, and maintain air tight connection between all the parts.

The lower end of the bushing is chamfered so as to enter and to be centered by a recess 147 in the top of the mold. By this construction, when the arm moves down and the bushing contacts with the mold, it will be moved laterally if the mold is slightly off center and be tilted if the lower surface of the bushing and the upper surface of the mold are not exactly parallel. The center of the sphere partly described by spherical seat 145 is in the plane of the bottom surface of the bushing, so that mere tilting of the bushing does not produce lateral movement of its bottom end.

In order that the charge of glass as it leaves the deflector 127 will be delivered properly into the bushing 128, notwithstanding slight lateral variation in its position resulting from its tilting and lateral movements in adjusting itself to the mold, provision is made for automatically adjusting the position of the deflector in accordance with the position of the bushing. As to this feature, which, however, is not included as part of the present invention, the deflector 127 is provided with a lug 151 (Fig. 23) attached by a screw 152 to an arm 153. The arm is mounted for slight universal movement by means of a thin plate 154 of flexible material, such as sheet steel. This plate is approximately square (Fig. 24) and the arm 153 is attached to the diagonally opposite corners of the plate. The other two corners of the plate are fastened by screws 155 to a bridge member 156 carried on the upper ends of the posts 140. This construction provides a universal pivot for the arm and, therefore, for the deflector 127, about a center indicated approximately at 157 (Figs. 23 and 24). The deflector 127 may be adjusted angularly by a stop screw 158, which bears against its lower end. The lower end of the arm 153 is connected with the upper end of the bushing 128, provision being made for adjusting the relation between them as may be required. The bushing is surrounded near its upper end by a ring 161 carrying a rectangular frame 162 (Fig. 27), supporting a pair of ears 163 which receive a bolt 164. The lower end of the arm 153 carries a tubular screw 165 (Fig. 24) filling the space on the bolt 164 between the ears, which may be turned to vary the relation between the lower end of the arm and the frame, and locked in adjusted position by tightening the bolt. The deflector is thus moved slightly in accordance with the varying positions of the bushing 128 which, in turn, is positioned by the mold, so that each mold charge is always delivered from the deflector in proper relation to the bushing and is guided by the bushing centrally into the mold.

When the bushing moves down into contact with the parison mold, the two mold halves are held firmly together by the ring 144 associated with the bushing (Fig. 26). The interior of this ring is slightly conical and the upper end of the parison mold is chamfered so that as the arm 131 lowers the bushing, the ring engages the mold and holds the two halves firmly together. The springs 143 yield to permit further downward movement of the bushing into firm contact with the mold after the downward movement of the ring has stopped. The charge is then delivered into the mold.

The settle blow is then applied to the charge by a blow head 168, which moves forward from its inoperative position shown in Fig. 23, to close the entrance to the bushing 128 and supply compressed air thereto, as shown in Fig. 21, where it is pressed firmly against the bearing plate 141 to make an air tight connection therewith, by a pair of lugs 169 carried on the vertical walls at the end of the arm 131 and cooperating lugs 170 on the sides on the blow head. These lugs are provided with wedge surfaces which clamp the head down at the completion of its stroke. The bearing plate 141 is provided with a steel wearing plate 171 which takes the downward thrust of the blow head, and also facilitates changing the size of the opening leading to the bushing when a different size bushing is substituted to accommodate a larger or smaller mold charge. By removing the screws 139 (Fig. 27) and the nuts 172 on the posts 140, the bearing plate 141 and the parts carried therebelow may be lowered, so as to permit substitution of another plate 171 having a different size orifice to suit the changed bushing.

The movement of the blow head 168 into blowing position controls the application of the settle blow pressure. For this purpose, a rod 173 (Figs. 23 and 26) which actuates the blow head is provided with an air passage to the interior of the head. The head is provided with a port 174 to admit air to the bushing and the rod 173 is provided with one or more lateral ports 175 which, when the blow head is moved to the left into the position shown in Figs. 21 and 26, communicate with an annular chamber 178 in which a constant air pressure is maintained by a pipe 179 connecting with a suitable source of supply. The opening movement of the blow head, that is, to the right, shuts off the air pressure from the mold.

The movement of the blow head into and out of operative relation to the mold is automatically controlled. One end of the rod 173 carries a piston 180 movable in a cylinder formed in the arm 131, to which air pressure is admitted alternately to opposite sides of the piston by pipes 181 and 182. The application of pressure to these pipes is controlled by a valve 183 (Fig. 23) connected with a source of air pressure through a port 184. A plunger 185 is movable in the valve 183 to connect the inlet port 184 alternately with the pipes 181 and 182, by a cam 186 (Figs. 23 and 42) connected with the plunger by a lever 187. When the plunger 185 is in either of its extreme positions, it admits pressure to one of the pipes 181 or 182, and opens the other pipe to the atmosphere for the exhaust of the air in front of the piston 180.

In order to avoid abrupt movement in the blowhead 168, and the associated parts, the movements of the piston 180 at the ends of its stroke are air cushioned. The ports connected with the pipes 181 and 182 are positioned so as to be closed by the piston as it approaches either extreme position. These pipes are each connected by a by-pass 188 (Figs. 23 and 24) with a small port located beyond the stopping position of the piston at each end. When the piston approaches its stopping position, it first closes the pipe 181 or 182 which has been open to the atmosphere, and as the air remaining in advance of the piston can escape only through the by-pass which is of relatively small area, an air cushion is formed in front of the piston. The piston is also started slowly, since its first movement is produced by only such air as can enter through the by-pass 188, and as soon as the pipe 181 or 182 has been uncovered, the piston at once acquires its maximum speed.

The arm 131 is mounted on a vertical rod 191, which is actuated to elevate the arm and to move it yieldingly downward to seat the bushing on the mold. The blowhead arm 131 is clamped on the vertically reciprocatory rod 191, by screws 193 and a split bushing 192 (Figs. 23 and 24), and is vertically adjustable thereon. A collar 194 clamped on the rod 191 below the bushing and having a vertical pin 195 extending into the arm 131 determines and maintains the angular position of the arm on the rod (Fig. 25). This arrangement enables the arm 131 to be raised and lowered on the rod, to suit molds of different heights, without altering the alignment of the blowhead with the mold. A pinion 196 mounted on the bushing 192 engages rack teeth on the rod 191. By loosening the screws 193 and turning the pinion with a wrench applied to the squared pinion shaft 197, the arm may be easily raised or lowered. When the arm is to be lowered, the clamp screw of the collar 194 is loosened and the collar is lowered to the desired extent and again clamped before the arm is unclamped from the rod. Then the arm 131 may be lowered to the desired extent.

The rod 191 is rocked to swing the arm out of the path of certain parts of the machine during the travel of the molds from one station to the next. The lower end of the rod 191 (Figs. 28 and 29) is provided with a fixed gear segment 201 meshing with a rack formed on a slide bar 202. This bar is mounted in suitable bearings 203 and is moved in one direction by a cam 204 and in the other by a spring 205.

The rod 191 is raised and lowered by a cam 210 to move the blowhead out of and into contact with the mold. A spool 211 loosely mounted on the lower end of the rod, is held yieldingly against the bottom of the gear segment 201 by a spring 206, the lower end of which is supported by a nut 207 on the rod. The spool is engaged by the forked end of a lever 208 carrying a roll 209 engaged by the cam 210. Rotation of the cam causes the rod 191 to be positively lifted, through the engagement of the spool 211 with the bottom of the gear segment 201 and moves it yieldingly downward until the blowhead engages the mold, after which further movement of the lever 208 compresses the spring 206, thus insuring firm contact between the blow head and the mold.

*Plunger.*—When the parison mold arrives at the charging station, with the neck ring in closed position at the lower end of the mold and forming a part thereof, a plunger 214 (Fig. 21) permanently located below the charging position of the mold is arranged to be moved vertically into the neck ring, to form the initial opening in the parison and complete the top "finish" of the bottle. Mechanism is associated with the plunger for clamping the neck ring halves in closed position. To insure the entrance of the plunger into the neck rings and to center it therein, notwithstanding slight variation in position of successive neck rings, the plunger is arranged for a floating movement so that it can move laterally into register with the opening in the neck ring. The plunger is screwed into a block 215 supported on the flat top of a flanged collar 216. The block is loosely retained on the top of the collar by hooks 217 which permit the block to slide slightly on the top of the collar, into register with the neck ring opening. Means for circulating a cooling fluid in the interior of the plunger comprise a pipe 218 connected with a suitable source of air, or other cooling medium, which flows into a chamber 219 in the block 215 and thence upwardly through a pipe 220 loose in a hole in the interior of the plunger. The fluid passes up through the pipe 220 and then down adjacent the walls of the plunger and escapes through a port shown by dotted line at 221. Suitable flexible connections are provided where necessary in the pipe 218 and other places, to permit movement of the plunger.

The neck ring halves are held in closed position while the plunger is elevated, by a clamp ring 222 carrying a number of studs 223 surrounded by springs 224 between the ring and the lower flange on the collar 216. These springs tend to hold the clamp ring in elevated position, so that it engages the neck ring arms 97 before the plunger has finally seated itself in the neck ring, after which the springs are compressed.

The plunger is reciprocated vertically by suitable cam mechanism which acts through an interposed spring to produce a yielding upward movement. The collar 216 carrying the plunger is secured to the upper end of a rod 227 mounted in bearings in a rectangular frame 228 arranged to slide in vertical ways 229 (Fig. 10). The frame 228 is positively reciprocated by a bell crank 231 connected to the frame by a link 230 and actuated by a cam 232. The rod 227 carrying the plunger is lifted through the medium of a spring 233 confined between a collar 234 fixed on a rod and a cross bar 235 formed integral with the frame 228. When the plunger seats in the neck ring, the final lifting movement of the frame compresses the spring 233, so as to produce a clearance between the collar 234 and the upper bearing 236 of the frame 228, as shown in Fig. 21. The downward movement of the plunger is positive, due to the engagement of the bearing 236 with the top of the collar 234.

The plunger mechanism is one of the parts of the machine connected with a general safety system which causes the machine to be stopped by abnormal operation of any of the parts so connected. This safety system will later be described in detail. For the present it is sufficient to say that it is embodied in a series of pipes 513 leading to a diaphragm chamber (Fig. 20) adjacent to the driving clutch. Air pressure in the pipes operates through the diaphragm to maintain the clutch in driving position. Escape of this pressure from any part of the system releases the clutch and stops the machine. Safety valves for this purpose are disposed adjacent to any part of the machine needing such safeguard, and are opened in various ways by abnormal position or action of such parts.

In the case of the plunger mechanism, if by any accident, there is hardened glass in the neck ring when the plunger rises, it prevents the proper seating of the plunger and the machine is automatically stopped by this device, so as to prevent breakage. The safety device at this station is actuated by a rod 239 (Fig. 21), depending from the collar 234 and having its lower end projecting through a clearance hole in the cross bar 235 into position above the end of a lever 240 pivotally mounted on the horizontal arm of the bell crank 231. The other end of the lever 240 lies below a stem 241 of a safety valve 242, which is connected by a pipe with the pneumatically controlled safety system above referred to. The space between the bottom of the rod 239 and the lever 240 permits a certain compression of the spring 233 without actuating the valve 242, but when this compression is exceeded, the last part of the upward movement of the bell crank 231 will cause the lever 240 to come into engagement with the rod 239, the upward movement of which has been stopped by some obstruction in the mold. The continued movement of the bell crank elevates the pivot of the lever 240, thereby tilting the lever and causing its short end to lift the valve stem 241 which releases air pressure from the pipe 513 of the safety system and stops the machine. A spring 243 holds the lever 240 normally against a stop pin 244. After the completion of the settle blow the bushing 128 is lifted and swung to inoperative position and the plunger is lowered, leaving the partially formed parison in the parison mold ready to be moved to the next station for further operations.

*Station B.*—The second station (B) is known as the counterblow station and it is here that the parison is completed as diagrammatically shown in Figs. 3 and 4. During the traverse of the molds from stations A to B, they are inverted so that the parison mold arrives at station B with its neck portion up, as shown in Figs. 3, 4, 14, and 30, with the neck ring still in closed position embracing the top of the parison.

*Counterblow bottom plate.*—The lower end of the parison mold is closed at this station by a bottom plate which moves up from below after the mold has come to rest. The bottom plate 245 (Fig. 30) is carried on the end of a vertical rod 246 which is reciprocated by a pair of cams 247 and 248 to which it is connected by a link 255 and a three arm bell-crank 250. The upward movement of the bottom plate is made yielding by a spring 249 carried by a rectangular frame 254. This frame and its connection with the rod 246 is substantially identical with the frame 228 and its connection to the rod 227 which carries the plunger 214 at station A, and it will be unnecessary to describe this again in detail. The cams 247 and 248 act, one to move the frame positively upward and the other to move it positively downward, but due to the interposition of the spring 249, the upward movement of the bottom plate 245 is yielding so that it is yieldingly pressed against the bottom of the parison mold 132.

The bottom plate is provided with a safety device which acts to stop the machine in case the bottom plate is stopped from rising to its normal position. This safety device is substantially identical with that of the plunger, above described, and comprises a rod 256 rigidly connected with the bottom plate which, if the bottom plate fails to rise to its normal position, engages the end of a lever 257 pivotally mounted on the long arm of the bell crank 250, and lifts the stem 241 of a safety valve 258, which releases pressure from the pipe 513 of the safety system and stops the machine.

The bottom plate 245 is secured to the top of the rod 246 by a bayonet joint, indicated at 259, which includes a disc 260 fixed on the bottom plate. This disc carries a clamping ring 261 which holds the two halves of the parison mold together during the counterblow. The ring 261 is provided with a series of studs 262 which pass through holes in the disc 260 and are surrounded by springs 263 interposed between the disc and the ring, so that it is held yieldingly in advance of the bottom plate, and engages the parison mold before the bottom plate has seated.

*Counterblow.*—The counterblow for expanding the parison in the blank mold is produced by a blow head, indicated as a whole at 266, permanently associated with each pair of molds and cooperating first with the parison mold for the counterblow and then with the blow mold for the finishing blow. The details of the blow head and its operation will be best understood in connection with the finishing blow at a later station. For the present, it is sufficient to state that in moving from stations A to B, the blow head is moved toward the neck ring and at station B (Fig. 14) engages the ring and air is admitted to counterblow the parison, after which the blow head is lifted, the bottom plate lowered, and the molds are moved to the transfer station C.

*Station C.*—The molds arrive at the transfer station C (Figs. 5, 6 and 7) with the neck portion of the parison mold up, in the same position in which they were at the counterblow station. As the molds approach station C, the neck rings are opened by the stationary cam 116, the action of which is shown in Fig. 17, it being noted, however, that the neck ring halves 96 open before the molds 61, 62 open to the position shown in this figure. As soon as the parison mold has come to rest with the neck ring open, the projecting top of the parison is grasped by the jaws 267 of the transfer tongs (Figs. 34, 35) which support the parison while the molds are opened and then reverted to exchange positions. When the molds are again closed, the parison is enclosed by the below mold. When the molds are first opened at this station, the bottle completed by the previous cycle is delivered from the blow mold (Fig. 6).

The transfer tongs are preferably arranged to lift the parison slightly after its mold has opened and then to lower it into position to be engaged by the blow mold. The purpose of this vertical movement is to provide clearance between the transfer tongs and the closing blow mold and also to insure that the bottom of the parison shall be positioned centrally of the bottom plate.

86 (Figs. 7 and 17). The bottom plate comes up with the blow mold under the suspended parison, on the arc of a circle, and if the parison has elongated slightly while suspended, without being thus moved vertically, it might be engaged by the bottom plate before the plate has come to its final position in alignment with the parison and be moved slightly to one side during the final arc movement of the plate. This would position the lower end of the parison at one side of the center of the blow mold, when it closes, which would produce an imperfect bottle. For this reason also the parison is not lowered until the blow mold has come to rest.

*Transfer tongs.*—The jaws 267 of the transfer tongs (Figs. 34, 35 and 36), which are properly shaped to engage the top of the parison without deforming it, are mounted on carriers 269 pivotally mounted on a stud 270 fixed in the end of a horizontal arm 271. The jaws are opened and closed by links 272 connecting each jaw with an equalizing lever 273. This lever is pivoted at its center on the end of a finger 274 loosely mounted on a rock shaft 275, by which the gripping action of the jaws is controlled. In order that the grip of the jaws 267 upon the top of the parison may be delicate enough to prevent deformation, the jaws are closed by a torsional spring 276 connecting the finger 274 with the rock shaft 275. When the jaws are opened, the thrust of the spring is taken by a stop pin 277 (Fig. 36) positioned in an elongated slot in the hub of the finger 274, and when the jaws engage the finish of the parison, this spring yields and therefore limits the pressure which might otherwise injure the parison.

If the molds fail to open at the proper time, due to their having become stuck by cold glass or for other reasons, the inverting movement will cause them to collide with the tongs, which would not happen if the molds were normally open (Fig. 17). In order that such an occurrence may not injure the parts, the tongs are arranged to lift under the action of the parison mold when it fails to open. For this purpose the arm 271 on which the jaws are mounted is pivotally connected at 280 (Figs. 10 and 36) to the upper end of a slide 281. By this construction, the upward movement of the parison mold, if it fails to open, swings the arm 271 and the parts carried thereby, from the full line position of Fig. 36 into the dotted line position.

This movement of the tongs would be caused by abnormal operation of the machine, and in order that the cause of the difficulty may be remedied before serious injury is done, the rising movement of the tongs is employed to actuate a safety valve 282 (Fig. 10), which stops the machine. The arm 271 is provided with a vertical finger 283 which is normally positioned opposite the beveled end of a bell crank 284 pivotally mounted on the frame 285 of the tongs. The vertical arm of the bell crank is positioned in front of the stem 241 of the safety valve 282, so that the counter-clockwise movement of the finger 283 due to the elevation of the arm 271, will engage the beveled edge of the horizontal arm of the bell crank 284 and lift it, thereby pressing upon the stem of the safety valve which by its connection with the safety system stops the machine.

In order to permit the lifting movement of the tongs, as has been described, the rock shaft 275 for actuating the jaws is made in two parts, the upper portion 275 being mounted in the arm 271 and the lower portion 286 (Fig. 36) being carried by the slide 281. The two parts of the rock shaft are connected when the tongs are in normal position by a separable clutch, comprising an arm 287 fixed on the shaft 275 and provided with a pin 288 which engages a slot in an arm 289 fixed on the upper end of the rock shaft 286. By this construction, the rock shaft 275 may be lifted at any time, which breaks the connection between it and the lower rock shaft 286. The rock shaft is turned to open the jaws by a cam 290 (Fig. 34) engaging a roll on a lever 291 bearing against a wide arm 292 fixed on the lower end of the rock shaft 286. The closing movement of the jaws is caused by a spring 295 having one end connected to a fixed part of the machine, and the other end engaging a pin 296 projecting from the arm 292. This spring tends to turn the rock shaft 275 in a clock-wise direction as viewed in Fig. 35, until the arm 287 engages a stop screw 297 (Fig. 34). The stop screw is so adjusted that it stops the movement of the rock shaft just after the jaws 267 have engaged the neck of the parison, putting the spring 276 under a slight tension which provides the gripping action of the jaws. The action of the large spring 295 is to close the jaws, while the smaller spring 276 provides a yield which imparts a delicate gripping action.

If the tongs should be lifted by the closed parison mold, due to an interruption of the timed relation of the movements of these parts, it is desirable that they shall be opened at once to prevent the strain occasioned by gripping the neck of the parison by the tongs which are turning about one axis, while the body of the parison is engaged by the mold moving about another axis. For this purpose a spring 298 (Fig. 34) connects the arm 287 with the tongs carrying arm 271, so that as soon as the connection between the upper rock shaft 275 and the lower rock shaft 286 is broken, the spring will turn the upper rock shaft and open the jaws.

The transfer tongs are moved vertically to move them out of the path of certain moving parts on the turret and to move the parison up and then down toward the bottom plate, by a cam 299 which engages a roll 300 on the bottom of the slide 281.

*Blowhead.*—The blow heads, one of which is associated with each pair of molds, act at the counterblow station B and again at a time after the molds leave the transfer station C as determined by the adjustment of the machine. The blowhead is moved vertically toward and from the left hand mold of each pair and which mold is to receive the blow is determined by the inversion of the molds; a rotation of 180 degrees of the molds around a horizontal axis serving to reverse their positions with relation to the blow head. In order to provide clearance for certain parts of the machine, the blow heads are arranged to be swung away laterally from the molds during their elevated inoperative periods. The operation of the blow head is, with one slight exception, which will be pointed out, the same at the counterblow station as during the finishing blow. Therefore, but one of these operations need be described in detail.

Each blow head is carried by an arm 301 (Fig. 14) and comprises a cylinder 308 integral with the arm, and a piston 302 having a stem 303. A stud 304 is screwed into the stem and a nut 305 on the stud holds a cup 306 in place on the top of the stem 303. The piston is held in elevated position within the cylinder by a spring 307 confined between the flange on the cup 306 and a disc 310 resting on the upper surface of the cylinder.

The parts which contact with the blow mold or the neck ring of the parison mold, as the case may be, are carried by the piston 302. As shown in Fig. 14, the blow head is cooperating with a parison mold and holding the neck ring 96 in closed position by a clamp ring 311 arranged to engage the tapered sides thereof. The ring 311 is carried by studs 312 mounted in the piston 302 and held yieldingly downward by springs 313. When the blow head is applying the finishing blow to the blow mold, the top of which is of the same shape outside as the top of the neck ring, the similarly tapered top of the blow mold is held closed in the same way (Fig. 14^A).

The upper surface of the neck ring, or of the blow mold, during the finishing blow, is engaged by a cup 314 attached to a bushing 315 mounted in a bore within the stem 303 and urged downwardly by a spring 316. When the piston 302 is moved downwardly, the lower edge of the cup 314 first engages with the upper surface of the neck ring or the blow mold, and on further movement, the clamp ring 311 engages the tapered sides of the neck ring or blow mold. The piston 302 continues its downward movement compressing the springs 313 and 316 until it is stopped by engagement with the upper end of the cup 314.

It sometimes happens that the upper surface of the neck ring or blow mold is not exactly horizontal and in order that the cup 314 may make an air tight connection with this surface, it is loosely mounted in the piston 302. The bushing 315 is enough smaller than the hole in which it is carried, to permit the cup to tilt as it engages the high side of the neck ring, and in order to make an air tight connection between the upper surface of the cup and the center of the piston, a washer 321 is provided, having its lower surface formed to receive a spherical seat in the upper end of the cup. Thus, if the cup is tilted, the washer is free to slide from one side to the other and form an air tight connection between the piston and the cup, being in effect a sliding ball joint.

The lateral position of the molds with respect to the blowhead may vary slightly in the different pairs of molds, and in order that the position of the mold-engaging parts of the blow head may be adjusted to correspond to the position of the molds, provision is made for adjusting these parts with relation to the blow head arm 301. For this purpose, the mold-engaging parts are eccentrically mounted, so that their rotation moves them laterally. The cylindrical cavity within the stem 303 is made eccentric with respect to the piston 302 (Fig. 16) and by turning the piston 302 within its cylinder, the mold-engaging parts may be adjusted laterally with relation to the arm 301, into alignment with the mold. In order that the piston may be locked in its adjusted rotative position with respect to the arm, the stem 303 is splined to receive a pin 322 mounted in the disc 310, held from rotation by clamping it beneath a cover 323 by means of screws 324. When the position of the mold-engaging parts is to be adjusted, the connection between the arm 301 and its vertical supporting rod 325 is first released by loosening screws 326 which clamp the arm on to the rod. The screws 324 are then loosened to free the disc 310, after which the piston 302 may be turned as far as may be necessary to bring the mold-engaging parts into proper register, and if this results in angular displacement of the arm 301, it is free to move on the shaft 325. The various screws are then tightened to hold the parts in adjusted position.

The connection between the parison in the blow mold and the blow head differs slightly during the finishing blow from that previously described. The top of the parison projects from the surface of the blow mold (Figs. 10 and 14^A) and it has been found desirable to direct the blowing pressure directly into the neck of the parison while substantially excluding it from the exterior thereof, in order to prevent the liability of leakage of the blowing air into the blow mold outside of the parison, which would prevent the latter from being fully expanded. The blowing pressure is directed into the neck of the parison by a perforated disc 327 screwed into the interior of the cup 314 to such a position that it will engage the top of the parison slightly before the cup engages the surface of the blow mold.

The air pressure for the blow head is transmitted from the interior of the rod 325 through a suitable port into the arm 301. When the piston 302 is in the uppermost position in which it is held by the spring 307, air is admitted above the piston through a port 328, the effective area of which is adjustable by means of a screw 329. The size of this port is such as to cause the piston to start its downward movement comparatively slowly and when it has moved down into approximately mold engaging position, the piston uncovers a larger port 330 which causes a rapid and firm seating of the parts on the mold. At about the same time that the port 330 is uncovered, ports 331 in the stem 303 are opened so as to admit blowing pressure through the hole in the bushing 315 to the inside of the cup 314 from which it is transmitted to the parison. By this arrangement a single air pressure acts first to move the mold-engaging parts into operative position and thereafter to blow the parison.

It is sometimes desirable that the air pressure used for the finishing blow shall be higher or lower than that used for the counterblow, and as this invention employs a single blow head for both the counterblow and the finishing blow, means are provided for supplying different air pressures to the blow head for these respective blows. For this purpose a distributor is provided, which at one time connects the blow head with air at one pressure, and at another time, with air at another pressure. The application of pressure to the blow head is controlled by a valve 334 (Figs. 10 and 14) located between the distributor and each blow head.

The blow head is capable of certain vertical movements and, therefore, the connection between the valve and the blow head is telescopic. The valve is connected with the rod 325 by a pipe 335 sliding inside the rod, a suitable stuffing box 336 being provided to make an air tight connection. Air pressure is transmitted to the valve through a pipe 337 and the connection between this pipe and the pipe 335 is controlled by a plunger 338 sliding in the valve, and provided with ports which at times complete the connection between the two pipes.

The mechanism for supplying different air pressures to the valve 334 and thence to the blow head, comprises a distributor 339 positioned at the center of the machine above the turret (Fig. 14). This distributor comprises a cylindrical member 340 held from rotation by an arm 345 and stud 346, on which is mounted a rotatable casing 341 (Fig. 15), carrying six of the radial pipes 337, one pipe leading to each of the valves 334 (Fig. 9). The counterblow occurs at station B, and therefore the construction of the distributor is such that any one of the pipes 337 while in position to communicate with this station, is connected with air of the pressure desired for the counterblow operation, through chamber 347, passage 348 and pipe 349. The member 340 is provided with a channel 342 of sufficient circumferential extent to communicate with all of the pipes 337 which may be employed for the finishing blow. Air is supplied to the channel 342 through a passage 343 and a pipe 344 leading to a source of air pressure desired for the finishing blow.

The blow head is moved vertically by a lever 588 (Figs. 10 and 14), having one end forked and provided with rolls engaging with an annular groove 589 formed between the upper surface of the hub of the arm 301 and a collar 590 fixed on the rod 325. The lever 588 is pivotally mounted on a bracket 591 secured to the turret 85, and its other end is provided with a cam roll engaging a cam path 592, formed on the surface of the fixed cylinder 352. As the turret advances to present the molds to successive stations, the lever causes the blow head to be elevated and depressed at the proper time during the forward movement of the turret.

The blow head is swung laterally, as it approaches its upper position, in order to avoid interference with certain parts of the machine, by a roll 593 (Figs. 10 and 14) projecting radially from the rod 325, and engaging a cam path 594 formed in a bearing 595 in which the rod 325 is supported for vertical movement. The shape of the cam path 594 is such that as the rod 325 approaches its highest position, the blow head will be swung away from a position in vertical alignment with the mold as shown at station F (Fig. 9) and to one side into the position shown at station A.

One of the important features of this invention resides in the construction by which the duration of the "reheating" period, during which the parison is allowed to equalize its temperature before blowing, and the duration of the period during which blowing pressure is applied to the parison or bottle, may each be freely adjusted in accordance with the character of the glass and the ware. In making certain types of ware, it is desirable that a period shall elapse between the transferring of the parison and the beginning of the finishing blow, in order that the chilled skin or "enamel"

on the surface may have time to absorb heat from the interior of the parison to render it more plastic, and this time varies greatly in accordance with the character of the ware. It is also desirable that the duration of the finishing blow shall be variable to suit the work. The present invention aims to secure complete adjustability of both the reheat period and the blow period without limitation either by the duration of the traverse between stations or the dwell of the mold at a station. Provision is made for opening and closing the blow valve 334 at any time whether the molds are moving or stationary. By setting the valve opening mechanism so that the blow is started after the desired reheating period, this period may be varied at will and by setting the valve closing mechanism to act after the desired blow period, it also may be freely and independently adjusted.

The blow valve 334 is opened and closed by two sets of actuators, one of which controls the valve for the counterblow and the other for the finish blow. Each of these sets of actuators comprises a valve opening device and a valve closing device, which are independently adjustable to vary the time of opening and closing the valves. The valve 334 is opened at the counterblow station by movement of the plunger 338 into the position shown in Figs. 14 and 45, by a trip 351 pivotally mounted at 350 on a stationary drum 352 (Figs. 9, 10 and 45), and it is closed by a trip 353 also mounted on the drum 352. As the counterblow usually occurs during the dwell of the molds at station B, the valve opening and closing trips 351 and 353 may be permanently secured to the drum 352 by screws 354 (Fig. 14), in operative relation to the valve while at this station. Or they may be adjustably clamped by T bolts 365, in a circumferential T slot 359. The trips are arranged to move the plunger 338 longitudinally to open the valve by the engagement of the trip 351 with the upper end of a pin 355 mounted in the plunger (Fig. 45), and to close the valve by the engagement of a shoulder 356 on the trip 353 with the opposite side of the lower end of the pin 355 (Fig. 46).

The valve opening trip 357 and the valve closing trip 358 (Figs. 9, 44, 47, 48) which control the valve for the finishing blow, are similar to the corresponding trips 351 and 353 employed at the counterblow station, but as the period of the finishing blow is adjustable so as to occur during all or any part of the time after the molds leave station C until they are about to leave station F, these finishing blow trips are adjustably clamped in the T-slot 359 of the drum 352 by bolts 365, so that the trips may be adjusted circumferentially in the slot and clamped therein by the T-bolts.

These four trip devices are turned to actuate the valves by means of cam or wiper surfaces rotating past the trips in suitable position and sequence, anti-friction rolls being preferably employed wherever convenient. An approved arrangement is herein shown whereby the actuating members are in the form of rolls 317, 318, 319 and 320 (Figs. 44-48). For convenience in adjusting these rolls or wipers, they are preferably, as herein shown, mounted on blocks 363, adjustably secured by suitable bolts in T-slots 361 extending circumferentially around the constantly rotating drum 362. These four rolls which, for conciseness of expression, are herein termed "wipers", and the co-engaging arms of the respective trips actuated by them, are disposed at four different levels (Figs. 45-48) to avoid interference with each other. For machines in which no such adjustment of the timing is necessary, these cam surfaces or wipers might be disposed in fixed relation around the periphery of a rotating cam occupying the position of the drum 362.

The drum 362 is secured on the upper end of the shaft 366, and is rotated constantly at a ratio of six revolutions of the drum to one complete revolution of the turret, or once for each advance of the turret. Thus, each wiper engages with its trip arm during each rotation of the drum 362. The times of operation of the blow valve may be varied by adjusting the corresponding wipers around the periphery of the drum 362. The trips should first be positioned opposite the points at which it is desired to actuate the respective valves, and then their respective wipers should be adjusted so as to engage the trips when the valves are in operative relation thereto. By the construction described, the counterblow pressure may be turned on and off at any time during the dwell of the molds at the counterblow station and the finishing blow pressure may be turned on and off at any time that may be desired after the molds reach station D and before they leave station F, either during the dwell or the traverse of the molds.

*Stations D, E and F.*—These stations are included broadly under the heading of blow stations, although the blowing may not occur at all of them, and position of these stations is not essential to the blowing operation. When the blow pressure is cut off by closing the valve 334, the cup 314 and clamp ring 311 will be lifted from the blow mold by the action of the spring 307, and as the molds leave station F, the blow head will be elevated and swung to one side, in which position the molds and associated parts arrive at station A.

*Turret.*—Various movements of the parts described are caused by or closely associated with the turret mechanism which will now be described. Power is applied to the machine by any well-known means, such, for example, as a pulley 559 (Fig. 42) on a shaft 552, driving a shaft 367 which may be provided with a universal joint 368 (Fig. 11) and connected with a shaft 369 by a pair of miter gears 370. The shaft 369 is provided with a worm which drives a gear 371 loosely mounted on a shaft 372, and connected thereto, at times, by a clutch collar 373. The other end of the shaft 372 carries a gear 374 meshing with a gear 375 mounted on a shaft 376 positioned diametrically below the turret, and which carries a bevel gear 377 meshing with a bevel gear 380 on the lower end of the vertical shaft 366 (Figs. 11, 13 and 42).

The turret 85 is intermittently rotated by a cam drum 383 on the shaft 372 through a series of six rolls 381 depending from the turret. These rolls are successively engaged by a cam path 382 on the drum 383, which acts as a worm and is provided with an inclined portion which imparts one sixth of a complete rotation to the turret, and a straight portion which holds the turret from rotation to stop the molds at the respective stations.

The turret is mounted to rotate on a fixed central column 384 (Fig. 13) and is provided with six equally spaced radial bores which receive the cylinders 84 of the respective heads (Fig. 13). Each cylinder contains a piston 385 having a rod 71 by which the molds are opened and closed. The inner end of the cylinder 84 is closed by a head 386 and the other end by a head 387. The piston rod 71 is provided with a guide 388 fixed on the rod and sliding in the cylinder.

The piston 385 is reciprocated in its cylinder by air pressure, and during the greater part of the cycle of the machine the piston is held at the outer or left end (viewing Fig. 13) of the cylinder, to hold the molds in closed position. When the molds are to be opened at station C, pressure is admitted on the left side of the piston through a port 389 connected by a suitable conduit with a valve 390 shown in dotted lines in Fig. 13. To close the molds the same valve admits pressure through a passage in the spider 392 and a port 391 in the projecting hub of cylinder head 386. The construction of this valve 390 is similar to the valve 183 (Fig. 23), the arrangement being such that when pressure is admitted through the port 389, which is then in the position shown, the port 391 at the inner end of the cylinder is open to the atmosphere. Conversely, when pressure is admitted through the port 391, the port 389, which is then inverted, communicates with the atmosphere through an annular groove 378 in the outside of the cylinder leading to the valve passages. The stem 393 of the valve 390 is held downward by a spring 394 so that pressure is applied to the right of the piston to hold the molds closed, unless the valve stem is lifted against the action of the spring.

A valve 390 is associated with each cylinder 84, and when the molds are at the transfer station, the valve stem 393 is in position to be lifted by a cam actuated mechanism permanently located at this station. The valve stem is lifted by a plunger 395 (Figs. 11 and 13) mounted to slide in a stationary bearing 396, vertically in line with the valve stem 393 when the molds are at the transfer station. This plunger is elevated at the proper time to cause the molds to open, by a cam 397 fixed on the shaft 376. The cam engages a roll mounted on the end of a lever 389, the free end of which supports the plunger 395. In order to prevent breakage, if for any reason the plunger 395 should be in elevated position as the valve stem 393 moves around into alignment therewith, the upper end of the plunger 395 is slotted to receive the forked end of the lever 399 pivotally mounted on a lug 400, and provided with an inclined surface 401. Thus, if the plunger 395 should be in elevated position as the stem 393 moves away from the observer toward the position shown in Fig. 13, the lower end of stem 393 will engage the inclined surface 401 and the plunger 395 will be depressed to its normal position. The various driving connections are so arranged that the valve 390 is actuated to admit air to the cylinder 84 to open the molds at the proper time during the dwell of the molds at the transfer station and to close the molds again before they leave this station.

*Mold invert mechanism.*—The molds are arranged to be inverted during their travel from station A to B and again during their dwell at station C, by half rotations of the mold carrying head and the cylinder 84 in the turret 85.

In order that the expansion of the cylinder 84 from the heat of the molds may not cause the cylinder to bind in the bore of the turret, the external diameter of the cylinder is made small enough to allow for the greatest possible expansion, and expansion rings 88 are used to prevent undue leakage of air. To support the mold carrying head, an outer bearing is provided between the annular bevel gear 405 attached to the fork 83 of the mold carrying head and the exterior of the cylindrical portion of the turret 85. This bearing may comprise anti-friction rollers 404 (Fig. 13) rolling in a raceway formed by two hardened concentric rings, the inner ring being mounted on the outside of the cylindrical portion of the turret and the outer ring being fixed in the annular bevel gear 405, or otherwise fixed to the mold carrying head. An inner bearing for the mold carrying head is formed by the hub of the cylinder head 386, journaled in the spider 392, which is fastened to the turret and revolves with it about column 384. In this way the outer bearing of the mold head, which is nearest the molds and receives the most heat therefrom, will by this construction expand its external ring as much as, if not more than its interior ring, thereby preventing it from binding on the rolls 404. The inner bearing formed by the cylinder head 386 is much smaller and is sufficiently remote from the heat of the molds to avoid binding from heat expansion.

The bevel gear 405, attached to each of the mold heads, is for the purpose of successively turning the mold heads and cylinders 84 on their respective axes one complete rotation, during each rotation of the turret to the positions shown in Figs. 1 to 8. This rotation of the mold heads is divided into two steps each of 180 degrees, and these steps are herein, for convenience of expression, referred to as the inversion and reversion respectively.

The inversion takes place while the mold head is moving from station A to station B (Figs. 2, 3, 12 and 19), and that movement is utilized for effecting the inversion, the gear 405 being brought into engagement with a stationary toothed rack or segment 406, which, as the gears 405 travel in a circular path, is curved to conform to an arc of that path. This rack is mounted on the lower edge of the fixed cylinder 352.

As shown in Fig. 19, the effective length of the rack 406 is less than the distance between the centers of the stations A and B, so that the teeth at the ends of the rack do not fully mesh with the teeth of adjacent gears 405 when the latter are at stations A and B. This is to allow the successive gears to be moved into their locking position at station A, and away from their locking position at station B, without interference from the rack 406. In this connection advantage is taken of the unbalanced condition of the mold heads, due to the fact that the blow molds are usually heavier than the parison molds. When the successive gears are at station A, the heavier blow mold is on the left-hand side as viewed in Fig. 19, thus preventing the mold head from turning in clockwise direction, when freed from the locking bolt 429. Thus this unbalanced condition of the mold head holds the gear into contact with the teeth at the right-hand end of the rack 406 in proper position for beginning the inverting movement as the gear 405 moves to the left from station A. Upon arriving at station B, the resultant inversion of the molds brings the heavier blow mold to the right-hand side, and the resultant tendency of the mold head to turn in a clockwise direction enables it to complete its turning movement to its locking position after passing the left-hand tooth of the rack 406. That tooth, however, prevents the gear from turning past its locking position without interfering with the next advancing movement of the gear 405 toward station C.

The second half revolution of the mold head, herein termed the reversion, preferably takes place while the molds are at the transfer station C. Since the turret is then stationary, the reversion cannot be effected by a stationary rack, as in the case of the inversion above described. Therefore, a movable rack 407 is employed for effecting the reversion. That rack is attached by screws 403 to a carrier 408 mounted to swing about the central column 384 (Figs. 12 and 12ᴮ). The carrier is oscillated by a link 409 connecting it with the arm 410 of a cam lever mounted on a stud 411 fixed in the stationary drum 352. The other arm 417 of this lever is offset, so as to lie in a plane above the horizontal web 364 of this stationary drum, and carries a roll 412 engaging a cam path 413 (Fig. 14) formed in a disc 414 attached to the rotary drum 362 (Fig. 12ᴬ). This drum rotates continuously as has been described, turning once for each advance of the turret from station to station. By properly shaping the cam path 413, the carrier 408 and rack 407 are turned counterclockwise in Figs. 12 and 12ᴮ, during the dwell of each pair of molds at the transfer station C to revert the molds. For the purpose of taking the upward thrust of the rack 407, the carrier 408 is provided with rolls 415 which bear against a stationary disc 416 carried on the central column 384 (Fig. 13).

During the reversion of the molds at station C, their tendency is to overrun by their acquired momentum. The unbalanced condition of the mold head, which as above described was advantageous for the inverting operation, is not favorable for the reverting operation, since that condition is reversed at station C. The heavier blow mold is on the right-hand side before the reversion, and on the left-hand side after the reversion, thus tending to turn the top of the gear 405 away from the rack 407 in each of these positions whenever the mold head is not held by the locking bolt. For this reason, the effective length of the rack 407 is made greater than the rack 406, and this additional length is obtained by means of movable auxiliary teeth 421 and 422 at the ends of the rack 407. These teeth are in the form of swinging pawls, the shanks 423 of which are pivotally mounted in the rack 407 and held yieldingly upward by springs 424 (Fig. 19). The teeth are arranged to be swung down so as to form extensions to the rack 407 by means of a fixed cam plate 425 on the stationary cylinder 352. Thus as either end of the rack approaches this station, the tooth 421 or 422 is moved down into engagement with the gear 405, thus enabling the rack to control the gear and the mold head throughout the time that the mold head is released by the locking bolt 429 for the reverting operation.

The gear shown at station C (Fig. 19) has just arrived there and the locking bolt has released the molds for inversion. The gear is not yet in mesh with rack 407, but is held from any accidental displacement prior to the movement of the rack into mesh therewith, by the auxiliary tooth 422 which, being under the cam plate 425, is held in engagement with the gear. The rack 407 next moves to the right under the action of the cam path 413. The initial turning movement of the gear is produced by the tooth 422 and the abutting relation of the first teeth of the rack. As soon as the tooth 422 has moved from under the cam plate 425, the spring 424 raises the tooth as indicated by dotted lines in Fig. 19, at 419, so that it will not collide with the gear then at station B. As the rack approaches the end of its stroke, the auxiliary tooth 421 is moved by the cam plate 425 down into position to engage the gear at station C, which prevents the gear from overrunning and when the rack stops, holds the gear in position until the locking bolt is applied. The cam roll 412, after the completion of the reversion, passes out of control of the cam path 413, as hereafter described, and its next movement is effected by the return or idle stroke of the rack which, by reason of its engagement with the gears 405, is carried forward as the turret advances the molds to the next station. As the rack approaches the end of its return stroke, the auxiliary tooth 422, which has been held in elevated position, will be lowered by the cam plate 425 to engage the gear approaching station C, and auxiliary tooth 421 will be raised clear of the gear leaving station C, the parts coming to rest in the full line position of the drawing (Fig. 19) ready to repeat their cycle.

To insure complete reversion of the molds in spite of inaccuracies which may exist in the individual mold heads and their reverting mechanism, the lever arm 410 is moved somewhat farther than exactness would require, and to provide for taking up this excess motion, the link 409 is made in two telescopic parts held in extended relation by a spring 418 (Fig. 12). This spring yields to any excess of movement of the lever after the molds are fully reverted and locked in reverted position.

The movable rack 407 has a working stroke to the right in Fig. 19 into the position indicated by dotted lines at 419, this movement being derived from the cam 413 as has been described. The return or idle stroke of the rack is caused by the next advance of the turret due to the engagement of the rack with the locked gears 405, and independently of the cam 413. During this return stroke, the cam roll 412 passed into a widened path 420 (Figs. 12 and 12ᴮ) and thus out of control of the cam 413, after the working stroke is completed, thus leaving the rack 407 free to be returned on its idle stroke by the next movement of the turret, transmitted to the rack by the bevel gears 405 then engaging the tooth 421 pivoted to the rack. The wider cam path 420, although not guiding the roll 214, conforms approximately to the path of the roll, narrowing again to engage the roll in time to revert the suceeding mold head.

To lock the mold heads in inverted and reverted positions, the hub of each gear 405 is provided with diametrically opposite sockets 428 (Figs. 13 and 19) to receive the tapered end of a lock bolt 429 movable vertically in the turret 85. The lower end of each bolt is engaged by one end of a lever 430 pivotally mounted on ears formed on the turret. The other end of the lever is urged downwardly to hold the bolts in locking position, by a spring pressed plunger 431. The lever carries a roll 432 which is lifted to withdraw the bolt from locking position during the inversion of the molds.

To permit inversion of the molds during their travel from station A to B, means are provided for holding each bolt 429 in withdrawn position between these stations. A cam track 433 (Figs. 11 and 19) is mounted on a fixed stud 434, below that part of the path of the rolls 432 extending from station A to a point just short of station B. In order that the head may be unlocked before the turret starts to move from station A, the track 433 is arranged to be lifted to engage the roll 432, by a rod 435 connected with a bell-crank 436 carrying a cam roll in engagement with a cam 437 mounted on the continuously rotating shaft 376. This lifts the track into substantially horizontal position, withdrawing the bolt 429 from locking position while at station A and holding it there until the roll runs off the track just before the molds arrive at station B. As the molds arrive at station B their inversion is completed and the lock bolt enters its socket.

When the molds come to rest at station C, the roll 432 is positioned over a plunger 440 mounted to slide in a part of the bearing 396 (Fig. 13). The plunger is reciprocated by a cam 441, mounted on the shaft 376, which acts upon a roll carried by a lever 442 upon which the plunger rests. The cam 441 is shaped to withdraw the bolt 429 before reversion of the molds at station C, and to permit it to resume locking position after the reversion. In order to prevent breakage in case the plunger should by chance be in elevated position as one of the levers 430 approaches it, the levers are provided with wedge shaped ends 443 which will engage the plunger 440 in advance of the roll and move one of the parts so as to prevent the roll from striking the side of the plunger.

*Brake.*—In order that the retarding of the turret may not produce undesirable stresses in the rotator cam 383 and other parts of the driving mechanism, the lower edge of the turret is provided with a channel 444 for a brake band 445 (Figs. 10, 11 and 13), which grips the turret just before it comes to rest so as to assist in stopping it. One end of the brake 445 is connected with a post 446, and the other end with an arm 447 fixed on the upper end of a rock shaft 448, which carries a second arm 449 connected by a rod 450 with a spring 451. The arrangement is such that the spring tends to hold the brake band in gripping position, from which it is released by the action of a cam 452 engaging a roll 458 on the end of the rod 450. The cam 452 is carried by the shaft 376 and is shaped to hold the brake band in inoperative position until the turret nears stopping position. At this time the cam permits the spring to act and the brake is applied and held in gripping position until just prior to the next movement of the turret.

Provision is made for disconnecting the machine from its power drive and driving it by hand, and when driven at such a slow speed the brake mechanism is unnecessary. The brake is, therefore, held inoperative while the machine is disconnected from its power driving mechanism, by connections between the clutch controlling mechanism and the brake. These connections comprise a bell crank 453 (Fig. 22) mounted on a fixed part of the machine, having its horizontal arm in position to drop behind the lever 449 at times and to hold it in inoperative position. The vertical arm of the bell crank is connected by a link 454 with an arm 455 by which the clutch collar is moved to control the machine. The connection between the link 454 and the bell crank provides for lost motion by means of the slot 456 (Fig. 22), which receives a pin on the bell crank. A spring 457 holds the pin in one end of the slot. If the clutch should be thrown out of engagement while the brake is being applied, the horizontal arm of the bell crank 453 will rest on top of the arm 449, and then the arm is moved out by hand to release the brake, this bell crank arm will drop behind the brake arm 449 under the influence of the spring 457 and prevent the brake from being again applied until the arm 455 is moved to re-engage the clutch.

*Stripper.*—It sometimes happens that when the molds are opened to deliver the finished bottle, it will stick to one of the mold halves and fail to be delivered therefrom, or it will be moved slightly to one side by the mold half before it frees itself, so that it is likely to be delivered at one side of its proper path. In order to insure that all bottles shall be stripped. i. e., free from the molds when the molds are opened, a stripper 461 (Figs. 9, 10, 31 and 32) is provided to engage the depending neck of the bottle if it should be carried to either side with one of the mold halves. As soon as the molds stop at station C, this stripper is moved up into position to surround the mouth end of the bottle (Fig. 31). The stripper is provided with a vertical wall 459 which encloses the mouth end of the bottle on three sides, and if the bottle should stick to a mold half and be moved to the right or left, this wall will engage the bottle and free or "strip" it from the mold. The stripper is mounted on a carrier 462 in which it may be adjusted vertically in accordance with the size of the mold and clamped by means of a screw 463. The carrier 462 normally forms a rigid extension on a bar 464, mounted on a standard 465 by a link 466 having one end pivoted on the standard and the other connected with the bar 464 by a pin 467. The lower end of the bar is connected by a link 468 with a casting 469 fixed on the standard. The stripper 461 is moved through a path determined by the radii of the links 466 and 468, by air pressure in a cylinder 470 containing a piston 471 connected with a rod 472. The upper end of the rod is connected to the bar 464 by links 473. Air is admitted to the cylinder, to operate the stripper, by a valve 474 (Figs. 10 and 11) controlled by a cam 475, so as to supply air pressure to the upper or lower sides of the piston 471 at the proper times. The construction of this valve is similar to the valve 183 (Fig. 23). The cam 475 is shaped to cause the stripper to move up into position shown in Fig. 31 as soon as the bottle arrives at station C. After the molds have opened as diagrammatically indicated by dotted lines, which show the molds turned 90 degrees from their actual position, the stripper is rapidly lowered and moved away from under the bottle, leaving it free to drop and be received tangentially on a curved chute 476 from which it may be taken by hand, or by suitable transfer means for further treatment.

If, for any reason, the upward movement of the stripper should be obstructed, provision is made to permit it to yield without breakage. For this purpose the carrier 462 is pivotally mounted on the pin 467 which also forms the fulcrum between link 466 and the bar 464. The carrier is held in normal working position by a tapered spring pressed plunger 477 (Fig. 31), which is seated in a recess in the upper end of the bar 464, and acts as a yielding latch. If the stripper should strike the bottle or any other rigid part in its upward movement, the resistance to its movement will cause the plunger 477 to slip out of the recess and allow the stripper to turn about the pin 467, into the position indicated by dotted lines at 478. When the obstruction has been removed, the stripper may be replaced by swinging it back to its normal position with the plunger again engaged in its recess.

*Clutch.*—In the illustrated embodiment of the invention, the clutch by which the machine is driven, is moved into driving position by pneumatic connections with a handle 480 (Figs. 11 and 33). Certain pneumatic and mechanical clutch releasing devices are provided, operable manually or automatically from various parts of the machine when any accident prevents normal operation of the parts. The clutch collar 373 (Figs. 11, 20 and 42) having a feathered connection with the shaft 372, is provided with a single driving tooth or shoulder, which is moved into engagement with a corresponding tooth or shoulder formed on the hub of the gear 371, by a fork 481 mounted on a rock shaft 482 to which the arm 455 is rigidly connected. With the clutch in inoperative position (Fig. 20), the end of the arm 455 is held between a head 483 on a rod 484 and one of the bearings formed in a casting 485 in which the rod slides. The rod is held in this position by a heavy spring 486 which acts against adjustable nuts 487 on the rod. Before the clutch can be thrown into drving position, the head 483 must be moved out of engagement with the end of the arm 455 and for this purpose the rod 484 is provided with a piston 488 in a cylinder 489 connected by a pipe 490 with a source of compressed air by which the rod may be moved and the spring 486 compresed. The piston is controlled by manipulation of the handle 480 which actuates a three-way valve 491 (Figs. 20, 39). When the handle is moved into the position indicated by dotted lines at 492, the movable member 493 of the valve 491, connects the pipe 490 with a pipe 498 leading to a source of pressure, and the piston 488 is actuated and the head 483 moved downward where it is held by a latch mechanism (Fig. 11).

The latch mechanism which holds the head 483 in position against the action of spring 486, is in the form of a toggle comprising a link 494 connected with the head 483 and a link 495 pivotally mounted on the casting 485. When the head 483 is moved downwardly (Fig. 20), this toggle is straightened (Fig. 11) and a finger 496 on the toggle, is engaged by a notch in a latch 497 which keeps the toggle straight and holds the head 483 in position. This movement has freed the arm 455 from the restraint of the head 483 and the arm may now be moved to throw the clutch collar 373 into engagement with its cooperating driving member.

It is preferred that the clutch shall be thrown into driving position by pneumatic means, and for this purpose a cylinder 500 is carried on the casting 485, provided with the usual piston and piston rod 501. A spring 502 holds the piston 501 at the head end of the cylinder 500 (Fig. 20) unless pressure is supplied to the cylinder through a pipe 503, when the piston rod 501 is moved outwardly into engagement with the arm 455, which is thereby moved to throw in the clutch (Fig. 11) where it is engaged by a latch 504 which holds the clutch in driving position. Pressure is supplied to the cylinder 500 to engage the clutch by turning the handle 480 into the dotted line position indicated at 505 (Fig. 20), which turns the valve member 493 to connect the supply pipe 498 with a pipe 506 to which the pipe 503 is connected.

With the parts in driving position (Fig. 11), if the latch 497 is moved to release the finger 496 controlling the locking toggle, the toggle will collapse and the heavy spring 486 will move the head 483 to the left, which will first disengage the latch 504 and release the arm 455 and thereafter move that arm, thus disconnecting the clutch.

*Safety system.*—The latch 497 is held in position to maintain the toggle 494—495 straightened in driving position by air pressure in a chamber 507, one side of which is closed by a diaphragm 508 (Fig. 20), and to which pressure is admitted by a pipe 509 connected with a constant source of supply. The pressure on the diaphragm acts through a button 510 and plate 511 against the latch 497, holding it against the action of a spring plunger 512 (Fig. 20). If the pressure in the chamber 507 drops below a certain minimum, the plunger 512 will depress the latch 497 and permit the toggle to collapse and throw out the clutch as has been described. The safety valves 242, 258, 282 and 514, indicated diagrammatically in Fig. 20, are located adjacent to the several working instrumentalities that it is necessary to protect from injury in the event of abnormal operation of the machine, and are connected with a chamber 507 by pipes 513. These instrumentalities include the neck plunger, bottom plate, transfer tongs and the overload release, which may be damaged if they operate out of synchronism or encounter obstructions not ordinarily present under normal operating conditions. Upon the abnormal operation of the part of the machine with which each valve is associated, it is opened to permit the escape of air from the pipes 513 and chamber 507, thus throwing out the clutch and stopping the machine.

The safety valves are similar in construction and comprise (Fig. 41) a chamber 515 connected by one of the pipes 513 with the chamber 507 (Fig. 20). The chamber 515 is closed by a valve 516 held in closed position by a spring 517 surrounding the valve stem 241. In each of the safety valves, this stem projects into the path of some member which is moved by the abnormal operation of the mechanism to lift the valve stem, thereby opening the valve 516 and permitting air to escape from the pipes 513, and therefore the chamber 507. This at once reduces the pressure in chamber 507 and causes the clutch to be thrown as has been described. The pressure supplied to the chamber 507 from the pipe 509 enters through a small aperture, whereas the escape through any of the safety valves is through a considerably larger aperture, therefore there is no opportunity while any valve is open, for the pressure to build up again in the chamber 507 from the constant supply thereto.

Where the safety valve is operated by a rapidly moving part, there is a possibility that the stem might be lifted and closed again so rapidly as to prevent a substantial reduction in the pressure behind the diaphragm. In certain instances a latch has been provided which, when the safety valve is once opened, holds it in open position until it is reset by hand. A latch 520 for this purpose (Fig. 41) is pivotally mounted on the valve casing and when the plate 516 is lifted, the latch is moved by a spring 521 under a shoulder of the valve and prevents it from being closed by spring 517. As soon as the cause of the abnormal operation of the parts has been removed, the safety valve may be returned to working condition by pulling out the latch 520.

*Overload releases.*—As additional general safeguards to prevent injury to the machine, whenever any of its parts encounter abnormal resistances from the glass or from any other cause, other release mechanisms are provided for automatically releasing the clutch and stopping the machine whenever such resistances react upon the driving devices to produce an overload of a predetermined extent, the mechanisms being adjustable to adapt them to release at any desired point in such increase of the load. Two of these release mechanisms are herein shown by way of illustration, one, herein referred to as a primary overload release (Figs. 40, 41 and 42) and a secondary overload release (Figs. 37 and 38).

A convenient way of driving the machine is through the shaft 552 either by a pulley 559 (Fig. 42) or by connection with the glass feeder, or other associated machine. The primary overload release mechanism is positioned in the driving connection between the pulley 559 or other source of power and the turret rotating cam 383. The speed ratio between the driving shaft 367 and the cam 383 is reduced by the worm and gear 371, and therefore a more delicate overload release is provided on the driving side of the speed reducing device where the shaft rotates at greater speed but under less torque. The turret 85 is rotated intermittently and on account of the weight of the moving parts, the larger part of the power required by the machine is used in turning the turret. This heavy load occurs intermittently, during the advance of the molds from one station to the next, and therefore the primary overload release is set to carry the maximum load, occurring while the turret is turning. Consequently, when the turret is stationary and not absorbing any power, the entire power capacity for which the primary release is set is applied to the working instrumentalities which, however, require only relatively slight power to drive them and would, therefore, be in danger of breakage. In order to prevent breakage of the working instrumentalities by accident during the dwell of the turret, a secondary overload release is provided, located between the turret rotating cam 383 and the working instrumentalities. This comprises a load indicator which is set to carry the maximum load of the parts other than the turret, which is but a small fraction of the full load of the machine. By this construction any accident to the glass working instrumentalities will cause the machine to be stopped by the secondary overload release, whether such accident occurs during the dwell or the traverse of the turret, and if any obstruction prevents the free rotation of the turret, the primary overload release will be actuated to stop the machine.

It has been found convenient to incorporate the secondary overload release in the connection between the shaft 372 and the gear 374 by which power is transmitted to all parts of the machine beyond the turret. The end of the shaft 372 (Figs. 37 and 38) is squared to receive a driving disc 524 on the hub of which the gear 374 is rotatably mounted. The gear is loosely mounted on the hub of the disc 524 and is held in position on the disc by a ring 525 and retaining plates 526 loosely embracing the disc. The gear carries a driven lug 527 and is turned thereby in the direction of the arrow (Fig. 37) by its engagement with a driving lug 528 carried by an arm 529 pivotally mounted on a stud 530 fixed in the disc 524. The arm 529 is held radially outward, so as to position the lug 528 behind the lug 527 in driving relation, by a spring 531 one end of which bears against a block 532 carried by the disc. Abnormal resistance of the driven parts reacting through the gear 374 and the lug 527 tends to swing the arm 529 inwardly and withdraw the lug 528 from behind the lug 527, which disconnects them and allows the gear 374 to drop back. The spring 531 is adjusted by the nuts 533 to the tension required for carrying the load assigned to the gear 374.

This inward movement of the arm 529 operates through additional mechanism shown in Figs. 20, 37 and 38, also to throw out the clutch 373 and stop the machine. Meanwhile the disconnection between the lugs 527 and 528 only allows the gear 374 and the parts driven by it to drop back to the angular extent indicated by a clearance between the lug 535 carried by the driving disc 524 and the left-hand side of the notch 534 (Fig. 37), but not far enough to allow of interference between those parts driven by the gear 374 and the mechanisms which continue to move with the turret. The extent of this clearance should, therefore, be adapted to such interfering conditions as may exist in any machine to which this device may be applied. When the parts are in driving relation (Fig. 37), this clearance is in advance of the lug 535 in the notch 534, but on the occurrence of an overload and the breaking of the driving connection between the lugs 527 and 528, the lug 535, passing through the clearance, will overtake and engage the other side of the notch 534 and again start the gear 374 into rotation. By this time, however, the clutch 373 will ordinarily be moved out and the machine stopped. But even if the clutch should fail to work, or be delayed in stopping the machine, the motion of the parts of the machine driven by the gear 374 will be resumed with a slight delay in the time of action, determined by the clearance between the lug 535 and its notch 534, which need only be a few degrees, not sufficient to cause damage to the machine.

The clutch 373 is thrown out upon the operation of the secondary overload release, through devices connected with the clutch controlling devices (Fig. 20) mechanically, instead of pneumatically as is the case with the safety valves. The plate 511 is reduced in thickness at the right of the part normally engaged by the latch 497 and when the secondary overload release operates, this plate is moved to the left which allows the latch 497 to enter the reduced portion of the plate under the action of the spring 512 and release the clutch just as a retraction of the diaphragm would release it.

The plate 511 is connected with the secondary overload release by a rod 536 and a lever 537 pivotally mounted on a fixed part of the machine and having its end 538 positioned in axial alignment with the shaft 372 in front of a spring pressed plunger 541 projecting from the end of the shaft (Figs. 20, 37 and 38). This plunger is normally held in retracted position against the action of its spring, by a latch 542 which engages a shoulder on the plunger. This latch is pivotally mounted on the stud 530 and when the arm 529 swings inwardly upon the occurrence of an overload, the latch 542 is moved by the engagement of an adjustable stop screw 543 carried by the arm 529. This moves the latch 542 into the position shown in broken lines (Fig. 37) and releases the plunger 541 which is thereupon moved outwardly by its spring, swinging the lever 537 and moving the rod 536 and plate 511 to the left (Fig. 20) which allows the latch 497 to drop and release the clutch 373 as previously described. The arm 529 and latch 542 are connected by a spring 544 (Fig. 37) which allows the latch 542 to yield if the plunger should be in front of it when the mechanism is reset for action, and completes the latching action when the plunger is depressed.

Pneumatically controlled mechanism is provided for resetting the plunger 541 after it has operated to stop the machine, and the same mechanism is also employed to render the secondary overload release temporarily inoperative when the machine is first thrown into operation. This is to avoid making the overload release operate needlessly while the inertia of the parts is being overcome. When the handle 480 is turned into the starting position indicated at 505 (Fig. 20) to throw the clutch into driving position, the plunger 541 is automatically reset if it is in projected position, and whether or not the overload release has operated, the plunger 541 is held in inoperative position as long as the handle 480 is held in starting position 505. Should the handle be returned to its central or running position before the parts have acquired sufficient momentum, the release will operate and the machine would be needlessly stopped by the excessive load of the starting torque. The plunger 541 is returned to and held in running position by a rod 545 (Figs. 20 and 38) mounted in axial alignment with the shaft 372 and engaging the opposite side of the rounded head 538 of the lever 537 from that engaged by the plunger 541. The rod is moved by a piston in cylinder 546 to which air is admitted from a pipe 547 connected with the pipe 506.

The secondary overload release does not in itself constitute a clutch to directly disconnect the machine from the power, but is, instead, an indicator or detector which, upon occurrence of abnormal load, relieves the immediate stress and throws mechanism into operation to disconnect the clutch.

In starting the machine after the occurrence of a stoppage, the handle 480 is first turned into the 505 position (Fig. 20) which admits air to the starting cylinder 500 and also to the overload resetting cylinder 546, but the starting cylinder 500 is inoperative at this time on account of the clutch arm 455 being held in disconnected position by the heavy spring 486. If the stoppage was due to the operation of the secondary release, the air pressure in the cylinder 546 resets the plunger 541 where it is held by the latch 542, as has been described. The handle 480 is next turned to the position indicated at 492 which admits air to the cylinder 489, straightening the toggle 494—495 which is then locked in position by the latch 497. The handle is again turned into the position shown at 505 which now, by admitting pressure to the starting cylinder 500, moves the clutch arm 455 into driving position and at the same time holds the secondary overload release inoperative by means of cylinder 546. The handle 480 is controlled by a spring shown in dotted lines at 548 (Fig. 33), one end of which engages a fixed abutment 549 and the other end engages a lug 550 formed on the handle, the arrangement being such that the spring tends to hold the abutment 549 and lug 550 in line one above the other. Thus, when the handle is thrown into starting position 505 (Figs. 20 and 33), it must be held by the hand of the operator until the machine has acquired its momentum. As soon as the handle is released, the inner member 493 of the valve 491 returns to running position (Figs. 20 and 39) in which the pipes 490, 503, 506 and 547, are open to atmosphere through a port 551.

The glass shaping machine of the present invention is intended to operate in conjunction and synchronism with an automatic glass feeding machine. For this purpose a driving connection exists between the glass feeder and the shaping machine, the same source of power driving both the feeder and the shaping machine. It is desirable that there shall be no interruption in the operation of an automatic glass feeder and, therefore, the clutch 373 is adapted for stopping the shaping machine while allowing the feeder to continue in operation. But when the shaping machine is again thrown into operation, its original timed relation with the feeder must be re-established so that the two will operate in proper synchronism. This is done by the clutch 373 which has a single driving position and runs in synchronism with the two machines, a single revolution of the clutch corresponding to a complete cycle of both machines.

It is preferred to transmit power to the shaping machine through the shaft 367 operating at low torque and a higher speed whose rotation is transformed by reducing gearing to shaft 372 rotating at a slower speed and of greater torque at or near the machine. In order to obtain the advantage of a primary overload release capable of delicate adjustment at the low torque of this higher speed shaft, the present invention contemplates the provision of such a release located in the power transmission to the shaping machine at a point between the source of power and the speed reducing device. Connections are provided between the primary overload release and the single tooth clutch 373 by which the clutch will be thrown out upon occurrence of an overload and means is provided for automatically returning that part of the power transmission between the clutch and the primary overload release, to its original timed relation to the feeder after the clutch has been disconnected upon the occurrence of an overload.

The shaft 367 (Figs. 11 and 42) extends from the machine base and at a suitable place thereon the primary overload release, indicated as a whole at 558, is inserted. This release acts in a similar manner to the secondary release; that is, it is primarily an overload indicator which throws mechanism into operation for disconnecting the clutch, the relative movement of the parts, when an overload occurs, being incidental only and not depended upon to bring the machine permanently to rest. In order to restore the timed relation of the shaping machine with the feeder, means are provided for restoring the parts of this overload release which are relatively displaced by the occurrence of overload, to their original relative positions as soon as the clutch has been disconnected.

The source of power is indicated conventionally by the pulley 559 on a shaft 552 which is connected, through the overload release 558, with the shaft 367. The shaft 552 is mounted in suitable bearings 553 and provided with a square end which carries a driving disc 554 (Figs. 40 and 41). This disc carries a lever 555 mounted on a stud 556 and having one end held toward the shaft by a spring 557. The other end of the lever carries a roll 575 which, when in driving position, is seated in a notch 560 formed in a casing 561 constituting the driven member. The spring 557 holds the roll firmly in the notch with a force which may be adjusted by turning a screw 562 extending between a fixed pivot 563 and an arm 564 loosely mounted on the hub of the disc 554, one end of the spring being attached to the arm. The lever 555 is pivoted at 555$^a$ to a U-shaped spring carrying member 555$^b$ having its ends turned up as shown at 555$^c$ to support one end of the compression spring 557, the other end of which is connected at 564$^a$ to the end of the rod 564$^b$, the other end of which rod is pivoted to the arm 564 at 564$^c$. Thus it will be seen that the spring 557 is a compression spring which acts to effect a pull between the pivotal points 555$^a$ and 564$^c$.

The casing 561 is attached to a flanged collar 565 which is loosely mounted on the hub of the disc 554 and connected through an intermediate collar 539 with a flange 540 on the end of the shaft 367. The shafts rotate in the direction of the arrow (Fig. 40), and when the torque overcomes the spring 557, the roll on the arm 555 will ride out of the notch 560 and the driving connection between the shafts 552 and 367 will be temporarily broken.

The swinging movement of the arm 555 when its roll rides out of the notch 560 is employed to open the safety valve 514 which is connected to stop the machine, as has been described. The arm 555 is pivotally mounted on its stud 556 which projects through the disc 554 and carries a hook 566. This hook is loosely mounted on the stud and is held in the position shown in dotted lines in Fig. 40, by the engagement of a pin 567 projecting laterally from the hook, with one side of a slot formed in the head of the stud 556. When the lever 555 is turned by its roll in riding out of the notch 560, the slot in the stud head moves with the lever in a clockwise direction, permitting the hook 566 to move inwardly under the action of a spring pressed plunger 568, into engagement with one of the teeth formed on a ring 569. The ring is loosely mounted on a projection from the bearing 553 and is normally stationary, but upon being engaged by the hook 566, it turns with the driving disc 554. The stem 241 of the safety valve 514 projects toward the ring 569 and comes into close proximity to a freely pivoted trip 570, the free end of which normally rests on the bottom of the teeth of the ring 569. When the ring is turned on the occurrence of overload, the teeth in passing under the trip 570 lift it and cause it to lift the valve stem which stops the machine through the pneumatic connections described.

As soon as the clutch 373 is disconnected, practically all of the load is removed from the worm and gear 371 and shafts 369 and 367, and means are provided for returning these parts of the power transmission and the connected parts of the overload release, to their original positions relative to the power shaft 552, as soon as the clutch is disconnected.

Under normal operating conditions, the casing 561 and disc 554 are held in their normal relative angular positions (Fig. 40), by a coiled spring 571 having its inner end attached to the driven collar 565 and its outer end secured to a pin 572 in the driving disc 554. The spring is under a normal tension so as to hold a stop 573 on the disc against a lug 574 (dotted lines, Fig. 40) projecting longitudinally from the edge of the casing 561, in which position the roll 575 is seated in the notch 560. When the shaft 367 is stopped by the occurrence of an abnormal load, the continued partial rotation of the disc 554 winds up the spring 571 until the clutch 373 is released when the spring turns the collar 565 and hence the shaft 367 back to its original relation to the shaft 552 with the roll 575 seated in driving position in the notch 560 and the stop 573 against the lug 574. The rotation of the now idle shafts 367 and 369, and the driving member of the clutch then continues and when the clutch is again thrown in, its single driving tooth will pick up the machine at the proper time to restore its original timed relation to the power shaft 552 and, therefore, with the feeder connected thereto.

Fig. 54 indicates, in a conventional manner, one form of automatic feeder which may be employed to deliver mold charges to the shaping machine. The feeder illustrated comprises shears 577, actuated by cams 578 on a shaft 579, to sever mold charges from the glass discharged from a container 580. The charge is delivered by the chute 126 leading to the parison mold 132 of the shaping machine.

The shear actuating shaft 579 of the feeder is connected with the shaping machine through a power transmission comprising a worm and gear 581, shaft 582, miter gears 583 and the shaft 552 connected with the shaping machine as has been described. The transmission between the two machines may be varied as desired, the essential feature being that the time of delivery of the mold charges by the feeder, shall correspond with the time the respective molds of the shaping machine are in charge receiving position. In the illustrated apparatus, one revolution of the feeder shaft 579 produces one charge and one revolution of the turret rotating shaft 372 presents a mold in receiving position. Therefore, the two speed change devices, which are the worm and gear 371 of the shaping machine and 581 of the feeder, are constructed to reduce the speed in equal ratios whereby the shafts 372 and 579 rotate in synchronism. This timed relation will be re-established, after stoppage of the shaping machine, through the single tooth clutch 373, and means have been described for restoring the timed relation of that part of the transmission between the primary overload release 558 and the clutch 373 after each actuation of this overload release.

The neck ring, when in closed position, forms an extension of the parison mold and is, broadly considered, a part of the mold. Therefore, the term "mold" found in certain of the appended claims, may be understood to include within its meaning, the neck ring or other parts which form the confining walls of the glass shaping cavity, where the context so permits.

The specific embodiment of the invention which has been described has been selected for the purpose of illustration only, and it is to be understood that the invention is capable of various modifications both as to the separate parts, and the combinations thereof, within the skill of an artisan, without departing from the scope of the invention as defined by the appended claims, whereby the various features may be modified to suit widely varying conditions encountered in the manufacture of glassware.

Certain matter shown and described, but not claimed in this application, is also shown and described in the application of Homer A. Genest, Serial No. 490,597, filed on the same day as this application. Certain other features, including the means for mounting the molds for inversion and reversion, for causing such inversion and reversion, for locking the molds in inverted or reverted position, and the specific blowing mechanism and timing means therefor, and features incident to the aforesaid features, while shown herein, are not claimed in this application, but constitute the subjects matter of claims of my divisional applications, Serial No. 253,689, filed Feb. 11, 1928, and Serial No. 278,296, filed May 16, 1928.

I claim as my invention:—

1. In a glass blowing machine, the combination of a parison mold and a blow mold, one part of the parison mold being movable with one part of the blow mold, a rigid but adjustable connection between another part of the parison mold and another part of the blow mold, and means for opening and closing the molds simultaneously.

2. In a glass shaping machine, the combination of a split mold having a generally cylindrical exterior surface, a carrier for each of the mold parts, one of said carriers having a cylindrical recess to receive the part, and means for adjusting the mold part in said recess to cause it to accurately register with the other of said parts.

3. In a glass shaping machine, the combination of a mold from which the shaped ware projects, a stripper surrounding the projecting part of the ware, means for opening the molds, and means for moving the stripper downwardly from the ware at a greater speed than the speed of fall of the ware.

4. In a machine having a mold for shaping glassware, the combination of a guiding member cooperating with the mold when a charge of molten glass is delivered thereto and a support having a universal connection with the member whereby the member may be swung into register with the mold.

5. In a machine having a mold for shaping glassware, the combination of a guiding member to guide a charge of molten glass into the mold, a ring loosely connected with the member and arranged to permit lateral movement thereof, and a support having a ball and socket connection with the ring whereby the member may move bodily and angularly into register with the mold.

6. In a machine having a mold for shaping molten glass, the combination of a guiding member to guide a charge of molten glass to the mold, and a support movable toward and from the mold and having a ball and socket connection with the member, the center of said connection being substantially in the plane of the mold engaging surface of the member whereby the member is capable of angular movement without substantial lateral displacement of the mold engaging surface.

7. The combination with a glass shaping machine, of a glass feeding machine for periodically feeding mold charges to the shaping machine, a common driving connection driving the two machines in a definite timed relation and connecting with a source of power, a clutch in the driving connection adapted to be dis-engaged during the operation of the driving connection to stop the operation of the shaping machine while permitting the continued operation of the glass feeding machine.

8. Apparatus for operating on molten glass, comprising a shaping machine, means for periodically feeding mold charges to the shaping machine, a driving connection between the shaping machine and the charge feeding means adapted to operate the two synchronously in a proper timed relation, means for stopping the shaping machine independently of the feeding means and for again starting the shaping machine in said proper timed relation to the feeding means.

9. The combination with a glass shaping machine, of a glass feeding machine for periodically feeding mold charges of molten glass to the shaping machine, a common driving connection driving the two machines in a definite timed relation and connecting with a source of power, a clutch in the driving connection adapted to be dis-engaged to stop the operation of the shaping machine while permitting continued operation of the feeding machine and to re-establish positively the original timed relation between the machines when it is re-engaged.

10. The combination with a glass shaping machine and apparatus for feeding mold charges thereto, of a driving connection between the two arranged to maintain their operations in proper timed relation, a clutch for breaking the driving connection so as to permit the operation of the feeding apparatus and stop the operation of the shaping machine, said clutch being adapted to re-establish positively said proper timed relation between the shaping machine and feeding apparatus when it is re-engaged.

11. In an apparatus for operating on molten glass, including a shaping machine having a driving connection with means for periodically delivering mold charges thereto, the combination of means for stopping the shaping machine independently of the delivering means and means for throwing the shaping machine into operation in a predetermined timed relation to the delivering means.

12. In an apparatus for operating on molten glass, including a shaping machine adapted to receive periodically delivered mold charges, the combination of speed changing devices in the power connections to the shaping machine, means for interrupting the driving connection between the source of power and the speed changing devices, and means for automatically restoring the original timed relation between the source of power and the shaping machine whereby the shaping machine is actuated in proper time to receive the mold charges.

13. In a glass shaping machine, the combination with a rotary turret, of a brake, means for applying the brake in timed relation to the rotation of the turret, a clutch to connect the turret with a source of power, a latch to hold the brake inoperative, and means to render the latch effective when the clutch is dis-engaged.

14. In apparatus for operating on molten glass, the combination of means for forming the glass into mold charges, a glass shaping machine to which the charges are delivered, power connections between the charge forming means and the shaping machine, and means in said connections for rendering the shaping machine inoperative upon the occurrence of an overload.

15. The combination with a glass shaping machine, of a clutch connecting the machine with a source of power, an overload indicator in the power connections, and means actuated by the indicator for disconnecting the clutch upon the occurrence of an overload.

16. The combination with a glass shaping machine having driving connections to a continuously rotating shaft, of a speed change device in the driving connections, means located between the speed change device and said shaft for breaking the driving connection, and means to restore the original timed relation between the shaft and the machine when the driving connection is re-connected.

17. In apparatus for operating on molten glass, the combination of means for forming the glass into mold charges, a glass shaping machine, a driving connection between the charge forming means and the glass shaping machine, means for discontinuing said driving connection on the occurrence of abnormal load in the machine, and means for re-establishing the timed relation between the charge forming means and the machine when the driving connection is re-established.

18. The combination with a device for separating molten glass into mold charges having a driving connection with a synchronously operating machine for shaping said mold charges, of an overload indicator in the driving connection between the device and the machine, a clutch controlling the driving connection to the shaping machine, connections between the overload indicator and the clutch for disconnecting the clutch on the occurrence of overload and means for restoring the original timed relation of the device and the machine when the clutch is reconnected.

19. The combination with a device for separating molten glass into mold charges, a machine for shaping the mold charges, and a single shaft from which the charge separating device and the forming machine are operated, of a clutch to drive the machine, a speed reduction mechanism between the clutch and the shaft, an overload indicator connected with the shaft, connections between the indicator and the clutch whereby the clutch is disconnected upon the occurrence of overload, and automatic means for resetting the overload indicator in its original condition after the clutch is disconnected.

20. The combination with a device for separating molten glass into mold charges and a synchronously operating machine for shaping said charges, of a shaft by which the charge forming device and the shaping machine are operated, a speed changing device in the driving connection to the machine, a clutch between the speed changing device and the machine, an overload indicator between the speed changing device and the source of power, connections between the indicator and the clutch whereby the clutch is disconnected upon the occurrence of an abnormal load, and automatic means for returning the driving connections between the indicator and the clutch to their original timed relation to the charge separating device after the occurrence of an overload.

21. The combination with a glass shaping machine, of a clutch connecting the machine with a source of power, a yielding driving connection to a part of the working instrumentalities of the machine, means for disconnecting the clutch upon the occurrence of a yielding movement in said connections, and means for continuing a positive drive through said connections before the yielding movement has injuriously changed the timed relation of the instrumentalities driven thereby with relation to the other instrumentalities.

22. The combinaion with a glass shaping machine, of a main shaft driving the machine through a transmission train, a speed changing device between said shaft and the shaping instrumentalities of the machine, a clutch in the transmission train, an overload indicator located on the driving side of the speed changing device, means for disconnecting the clutch upon an indication of overload, and means acting automatically to return the overload indicator to its original condition upon the disconnection of the clutch.

23 The combination with a glass shaping machine of an overload indicator in a power connection to the machine, means for temporarily disconnecting the power from the machine on the occurrence of overload, a clutch, and connections between the indicator and the clutch for stopping the machine by releasing the clutch when an overload is indicated.

24. The combination with a glass shaping machine of an overload indicator in a power connection to the machine, means for temporarily disconnecting the power from the machine on the occurrence of overload, a clutch, connections between the indicator and the clutch for stopping the machine when an overload is indicated, and means to return the machine automatically to its original timed relation with the power transmission when it is again started.

25. The combination with a glass shaping machine having driving connections to a source of power, of a speed change device in said connections, a clutch in the connections, between the machine and said device, an overload indicator between the source of power and said device, and means for disconnecting the clutch upon the indication of an overload.

26. The combination with a glass shaping machine having driving connections to a source of power, of a speed change device in said connection, a clutch in the connections on one side of said device, an overload indicator on the other side of said device, and means for disconnecting the clutch upon the indication of an overload.

27. The combination with a glass shaping machine, of a driving shaft carrying one member of an overload indicator, a second shaft carrying the other member of the overload indicator, a speed change device connected with the second shaft, a clutch to connect the speed change device with the glass working instrumentalities of the machine in a predetermined timed relation, means for rendering the clutch inoperative upon relative movement of the members of the overload indicator, and means to return the driving member of the clutch to its original position with respect to the driving shaft after the clutch has been rendered inoperative by the overload indicator.

28. The combination with a glass shaping machine including a rotatable turret and glass working instrumentalities, of an overload indicator in a driving connection to the turret, an overload indicator in a driving connection to the working instrumentalities, and means for stopping the machine upon indication of an abnormal load by either indicator.

29. In a glass shaping machine having a transmission connecting a source of power first with a rotatable turret and then with glass working instrumentalities, the combination of an overload indicator between the source of power and the turret, a second indicator between the turret and said instrumentalities, and means for stopping the machine upon indication of an overload by either indicator.

30. The combination with a glass shaping machine, of a driving clutch for connecting the machine with a source of power, means for releasing the clutch upon the occurrence of an overload, and means for rendering the overload release inoperative when moving the clutch to driving position.

31. The combination with a glass shaping machine, of a driving clutch, an overload release, and a single means for moving the clutch into driving position and rendering the overload release inoperative.

32. A machine for shaping molten glass, having in combination a clutch for driving the machine, a pressure actuated member, connections between the member and the clutch for holding the clutch in driving position, a valve associated with a working instrumentality for controlling the pressure on the member, and means for actuating the valve upon the abnormal operation of its associated instrumentality whereby the pressure on the member is changed and the clutch disengaged.

33. A machine for shaping molten glass, having in combination a clutch for driving the machine, a pressure actuated member, a latch rendered operative by the member to hold the clutch in driving position, means actuated by the abnormal operation of the working instrumentalities for varying the pressure on the member to release the latch, and means actuated by the occurrence of an abnormal load on the machine for releasing the latch.

34. A machine for shaping molten glass, having in combination a clutch for driving the machine, a latch to hold the clutch in driving position, a member actuated by fluid pressure to render the latch operative, means actuated by the abnormal operation of the working instrumentalities for reducing the pressure on the member to release the latch, and means actuated by the occurrence of an abnormal load on the machine for releasing the latch independently of the member.

35. A machine for operating on molten glass, having in combination, a clutch to transmit power to the machine, means actuated by the abnormal operation of the glass working instrumentalities for disconnecting the clutch, and means for disconnecting the clutch upon an occurrence of an overload in the machine.

36. In a glass shaping machine, the combination of a mold, ware engaging tongs, means to actuate the tongs to engage the ware within the mold, means for relatively moving the tongs and the mold to remove the ware therefrom, and means actuated by the engagement of the tongs and the mold for stopping the machine.

37. In a glass shaping machine, the combination of a mold, ware engaging tongs, means to actuate the tongs to engage the ware in the mold, means for relatively moving the tongs and the mold to remove the ware therefrom, means to permit the tongs to be moved by accidental engagement with the mold, and means for stopping the machine upon such movement of the tongs.

38. In a glass shaping machine, the combination of a mold, ware engaging tongs, means for moving the tongs to engage the ware within the mold, means to permit the tongs to be moved by accidental engagement with the mold, and means to cause the tongs to disengage the ware upon such movement.

39. In a glass shaping machine, the combination of a mold, a member to close an opening to the mold cavity, means to move the member periodically into mold closing position and means to stop the machine when the member fails to close the mold opening.

40. In a glass shaping machine, the combination of a rotary turret, means for rotating said turret, a mold mounted on the turret, a member to close an opening to the mold cavity, means for moving the member into and out of mold closing position in timed relation to the movement of the turret, and means for stopping the turret if the member fails to close the mold opening.

41. The combination with a glass shaping machine, comprising a plurality of molds, of mechanism cooperating with said molds, a clutch for driving said mechanism, a member movable into and out of operative relation with the molds and connections between the clutch and the member whereby the clutch will be disconnected if the member fails to assume normal operative relation with a mold.

42. In a glass shaping machine, the combination of a mold, a member movable toward and from the mold to close an opening to the mold cavity, a positive actuating mechanism for the member, a yielding connection between the member and the actuating means, and means actuated by movement of the yielding connection for automatically stopping the machine.

43. In a glass shaping machine, the combination of a mold having a cooperating aperture closing member, means for moving the member toward and from the mold to close the aperture, and automatic means for stopping the machine upon failure of the member to close the aperture.

44. The combination with a machine for operating on molten glass of a clutch to transmit power to the machine, and means actuated by the abnormal operation of the glass working instrumentalities of the machine for disconnecting the clutch.

45. In a glass shaping machine, the combination of tongs, means for periodically opening and closing the tongs, and means rendered operative by an abnormal operation of the machine, for opening the tongs.

46. In a glass shaping machine, the combination of a mold, means for periodically opening the mold, a pair of tongs, means for closing the tongs in timed relation to the opening of the mold, means for relatively moving the tongs and the open mold, and means rendered operative by said relative movement, for opening the tongs if the molds fail to open.

47. In a glass shaping machine, the combination of a mold in which an article of glassware is formed, supporting tongs adapted to grip a part of said article prior to the opening of said mold, means for closing said tongs about said part of said article, means for opening said mold, means for effecting a relative movement of said tongs and said mold, and means rendered operative by the insufficient opening of said mold for opening said tongs.

48. In a glass shaping machine, the combination of a pair of tongs, a spring to open the tongs, power connections controlling the opening and closing of the tongs, a clutch in the power connections, and means for disconnecting the clutch upon abnormal operation of the machine whereby the spring is free to open the tongs.

49. In a glass shaping machine, the combination of a split mold, a tubular member on which the mold parts are pivoted for opening and closing movement, and a stud received within the tubular member whereby the molds are positioned in the machine.

Signed at Hartford, Conn., this 30th day of July, 1921.

EDWARD H. LORENZ.

CERTIFICATE OF CORRECTION.

Patent No. 1,740,310.  Granted December 17, 1929, to

EDWARD H. LORENZ.

It is hereby certified that error appears in the printed specification of the above numbered patent requiring correction as follows: Page 8, line 118, for the word "below" read "blow"; page 21, line 47, for "Fig. 54" read "Fig. 43"; and that the said Letters Patent should be read with these corrections therein that the same may conform to the record of the case in the Patent Office.

Signed and sealed this 28th day of January, A. D. 1930.

(Seal)

M. J. Moore,
Acting Commissioner of Patents.